(12) United States Patent
Chester et al.

(10) Patent No.: US 8,542,716 B2
(45) Date of Patent: Sep. 24, 2013

(54) CONTINUOUS TIME CHAOS DITHERING

(71) Applicant: Harris Corporation, Melbourne, FL (US)

(72) Inventors: David B. Chester, Palm Bay, FL (US); Alan J. Michaels, Indialantic, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/737,240

(22) Filed: Jan. 9, 2013

(65) Prior Publication Data
US 2013/0128930 A1    May 23, 2013

Related U.S. Application Data

(62) Division of application No. 12/480,264, filed on Jun. 8, 2009, now Pat. No. 8,428,102.

(51) Int. Cl.
*H04B 1/10* (2006.01)
*H04L 27/28* (2006.01)

(52) U.S. Cl.
USPC .............................. 375/141; 375/140

(58) Field of Classification Search
USPC .............................................. 375/141
See application file for complete search history.

(56) References Cited

U.S. PATENT DOCUMENTS

| | | | | |
|---|---|---|---|---|
| 6,529,568 | B1 * | 3/2003 | Richards et al. | 375/346 |
| 6,914,949 | B2 * | 7/2005 | Richards et al. | 375/346 |
| 7,024,172 | B1 * | 4/2006 | Murphy et al. | 455/324 |
| 2002/0034191 | A1 * | 3/2002 | Shattil | 370/464 |
| 2002/0061080 | A1 * | 5/2002 | Richards et al. | 375/346 |
| 2002/0061081 | A1 * | 5/2002 | Richards et al. | 375/346 |
| 2006/0128503 | A1 * | 6/2006 | Savarese et al. | 473/353 |

* cited by examiner

*Primary Examiner* — Erin File
(74) *Attorney, Agent, or Firm* — Fox Rothschild, LLP; Robert J. Sacco

(57) ABSTRACT

Embodiments of the present invention provide a system and method for further reducing cyclostationarity and correspondingly energy density in a chaotic spread spectrum data communication channel, by digitally generating a first chaotic sequence of values to form a spreading code. The spreading code is then used to form a digital IF spread spectrum signal having a uniform sampling interval. The digital IF spread spectrum signal is converted to a sampled analog IF spread spectrum signal at a conversion rate substantially equal to the uniform sampling interval. The duration of the sampling interval is then selectively varied in accordance with a first pseudo-random sequence, thereby introducing a known dither in the analog IF spread spectrum signal. After introducing the known dither, the analog IF spread spectrum signal is upconverted to an analog RF spread spectrum signal. The first pseudo-random sequences may be designed to be a chaotic sequence.

4 Claims, 10 Drawing Sheets

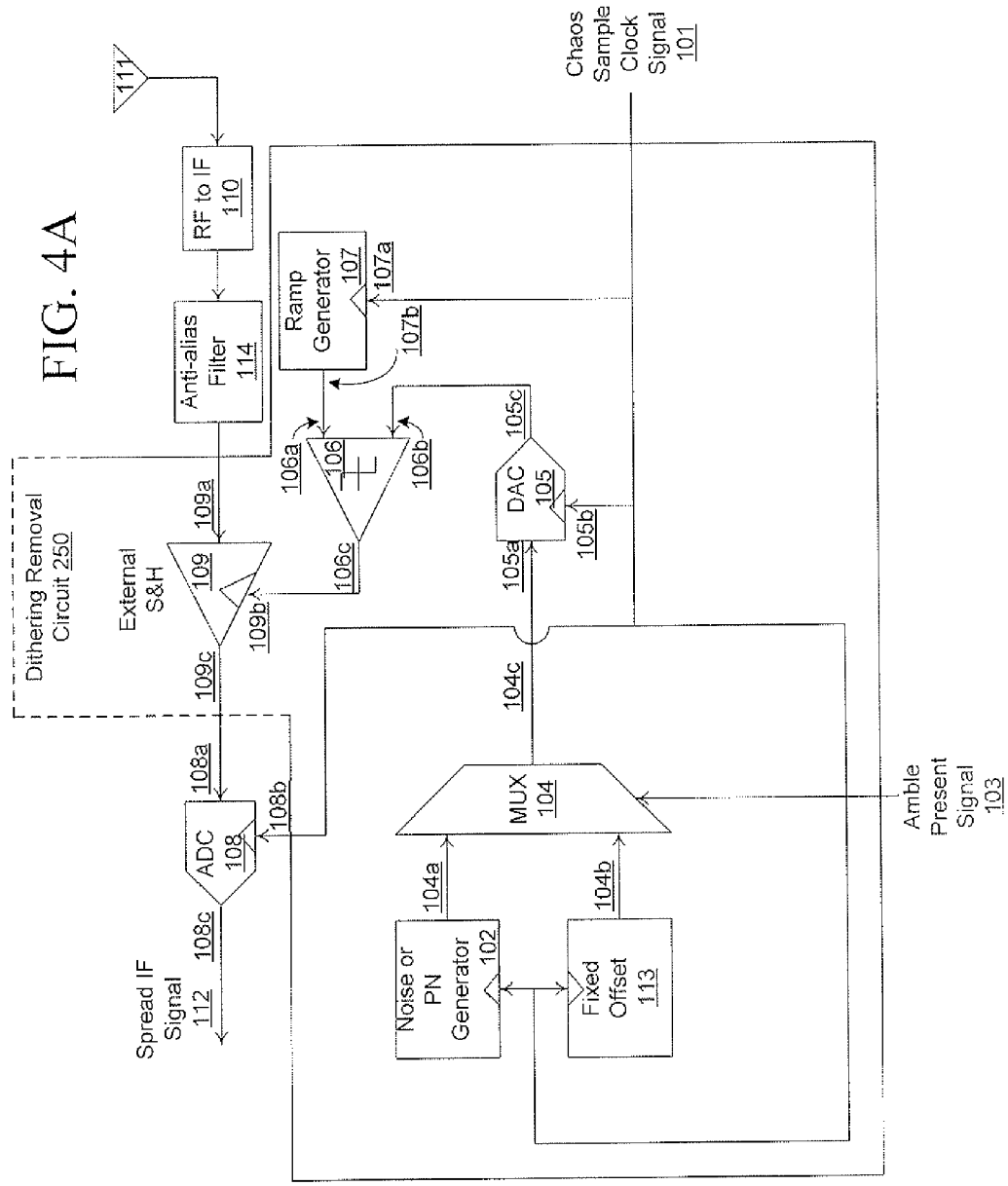

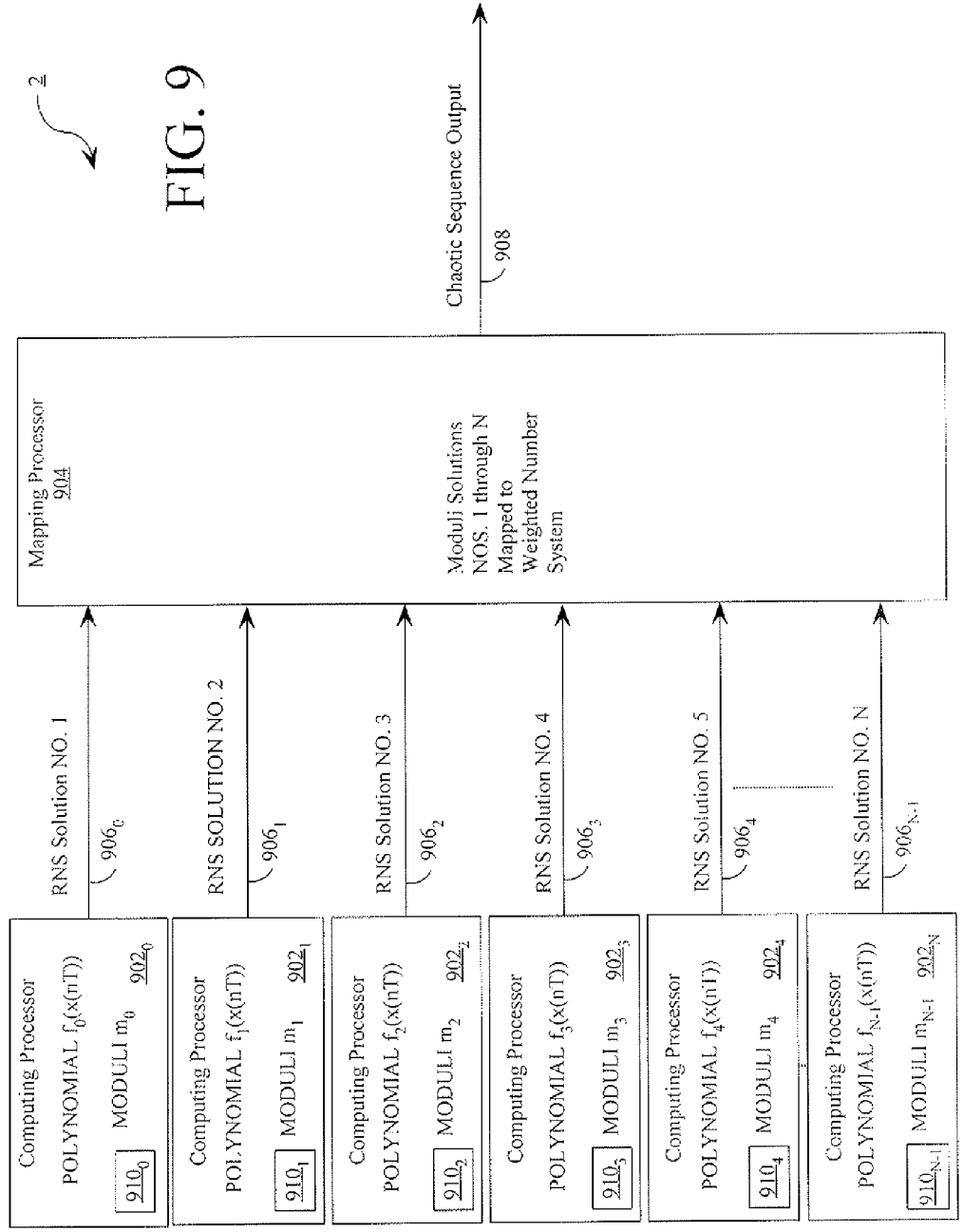

CONTINUOUS TIME CHAOS DITHERING

CROSS REFERENCE TO RELATED APPLICATIONS

This application is a divisional application of U.S. application Ser. No. 12/480,264 filed on Jun. 8, 2009, the contents of the foregoing application is incorporated herein by reference in its entirety.

BACKGROUND OF THE INVENTION

1. Statement of the Technical Field

The invention concerns communications systems. More particularly, the invention concerns a communications system having a transmitter configured to spread an input data signal over a wide intermediate frequency band, with a corresponding receiver to recover the input data from the spread transmitted signal.

2. Description of the Related Art

Covert radio communication is desirable in some circumstances. Communications systems may be designed to have a low probability of detection ("LPD"), wherein the probability is made smaller that an unintended receiver can detect the presence of a communication signal. Communications systems also may be designed to have a low probability of interception ("LPI"), wherein the probability is made smaller that an unintended receiver can receive and decode the communications signal. Information can not be transmitted without transmitting energy over a channel. However, the LPI/LPD characteristics of communications can be enhanced by reducing the cyclostationarity and correspondingly spectral energy density of the communications signal.

It is well known in the art that LPI/LPD characteristics are enhanced by the introduction of a pseudo-noise ("PN") chip sequence onto the transmitted waveform. The PN sequence is a deterministic sequence of +1 or −1, having a long period until it repeats, with the characteristic that sections of the PN sequence less than the whole sequence have the appearance of a random sequence of +1 or −1. The PN sequence operates to modulate the transmitted waveform at a rate that is higher than the information symbol rate of the transmitted waveform. The effect upon the transmitted spectrum is to convolve the spectrum of the PN signal with the spectrum of the modulated waveform prior to the PN sequence. Because the PN sequence is at a fast rate relative to the modulation symbol rate, the spectrum of the PN-modulated signal is greatly spread, thus reducing the peak spectral energy and power spectral density per unit bandwidth.

Pseudorandom number generators (PRNG) generally utilize digital logic or a digital computer and one or more algorithms to generate a sequence of numbers. While the output of conventional PRNG may approximate some of the properties of random numbers, they are not truly random. Since the algorithms used for generating pseudorandom sequences are deterministic, such sequences will always be periodic.

Chaotic systems can generally be thought of as systems which vary unpredictably unless all of its properties are known. When measured or observed, chaotic systems do not reveal any discernible regularity or order. Chaotic systems are distinguished by a sensitive dependence on a set of initial conditions and by having an evolution through time and space that appears to be quite random. However, despite its "random" appearance, chaos is a deterministic evolution.

Practically speaking, chaotic signals are extracted from chaotic systems and have random-like, non-periodic properties that are generated deterministically and are distinguishable from pseudo-random signals generated using conventional PRNG devices. In general, a chaotic sequence is one in which the sequence is empirically indistinguishable from true randomness absent some knowledge regarding the algorithm which is generating the chaos.

Communications systems utilizing chaotic sequences offer promise for being the basis of a next generation of LPI/LPD waveforms, and secure waveforms. The transmitter and receiver in coherent chaos based communication systems are synchronized by exchanging state information over a data link. Such a synchronization process offers diminishing return because state information must be exchanged more often between the transmitter and the receiver to obtain a high data rate. This high data rate results in a faster relative drift. In effect, state information must be exchanged at an increased rate between the transmitter and receiver to counteract the faster relative drift. Although some analog chaotic communications systems employ a relatively efficient synchronization process, these chaotic communications systems still suffer from low throughput.

Chaotic signals already have extremely robust LPI/LPD characteristics. The LPI/LPD characteristics can be improved further by increasing the perceived randomness of the transmitted signal, thereby reducing the peak spectral energy density. One way to reduce energy density is to increase the chaotic spreading ratio. However for a given symbol rate the spreading ratio can be limited by practical chaos generation rates.

SUMMARY OF THE INVENTION

The present invention is directed to method, apparatus and system for the transmission and reception of RF signals having improved suppression of the cyclostationarity and correspondingly spectral energy density of a transmitted signal, in particular the peak cyclostationarity and correspondingly spectral energy density.

Embodiments of the present invention relate to communication systems having a low probability of interception (LPI) and/or a low probability of detection (LPD). More specifically, embodiments of the present invention relate to a method, apparatus and system for the transmission and reception of RF signals having improved suppression of the cyclostationarity and correspondingly spectral energy density of a transmitted signal, by the introduction of a dither into the sample times of a sequence-spread signal. Preferably, embodiments of the present invention are practiced on a spread-spectrum communication system that utilizes chaotic sequences.

An additional layer of robustness and increased energy density suppression can be achieved by using a dithering mechanism that is known by both the transmitter and intended receiver, to force the non uniform sampling of the chaotic spread waveform.

Embodiments of the present invention provide a system and method for reducing energy density in a spread spectrum data communication channel, by digitally generating a first chaotic sequence of values to form a spreading code. The spreading code is then used to form a digital intermediate frequency (IF) spread spectrum signal having a uniform sampling interval. The digital IF spread spectrum signal is converted to an analog IF spread spectrum signal at a conversion rate substantially equal to the uniform sampling interval. The duration of the sampling interval is then selectively varied in accordance with a first pseudo-random sequence, thereby introducing a known dither in the analog IF spread spectrum signal. After introducing the known dither, the analog IF spread spectrum signal is upconverted to an analog RF spread spectrum signal. A variation on this embodiment is that the first pseudo-random sequence is designed to be a chaotic sequence.

Optionally, this system and method may further include receiving the RF spread spectrum signal at a receiver, converting the RF spread spectrum signal to a received analog IF spread spectrum signal, generating at said receiver a second pseudo-random sequence which is identical to the first pseudo-random sequence, and using the second pseudo-random sequence to remove the known dither in said received analog IF spread spectrum signal and thereby generate a uniform received analog IF spread spectrum signal having said uniform sampling interval.

An exemplary method and apparatus of selectively varying a duration of the sampling interval further includes holding a first sample of the analog IF spread spectrum signal having a first time delay, buffering a second sample of the analog IF spread spectrum signal having a second time delay, then selectively varying a duration of an output sample time of the first sample and said second sample responsive to a dither control signal.

The system and method of the present invention may also include synchronously gating the first pseudo-random sequence and the second pseudo-random sequence.

Embodiments of the invention may also include an apparatus for enhancing energy density in a spread spectrum data communication channel, including portions of the receiving side of the system, such as a receiver receiving said RF spread spectrum signal, a converter converting the RF spread spectrum signal to a received analog IF spread spectrum signal, and a generator at the receiver producing a second pseudo-random sequence which is identical to said first pseudo-random sequence. A demodulator then uses the second pseudo-random sequence to remove the known dither in the received analog IF spread spectrum signal and thereby generates a uniform received analog IF spread spectrum signal having said uniform sampling interval. A converter then converts the received analog IF spread spectrum signal to a received digital IF spread spectrum signal.

Variations of this embodiment may include synchronizing the first pseudo-random sequence with the second pseudo-random sequence. Further, a generator at the receiver may generate a despreading code which is identical to, and synchronized with, the spreading code in the transmitter, then de-spreading the received digital IF spread spectrum signal using the de-spreading code.

An embodiment of the timing variation apparatus further may include a first voltage generator producing a voltage responsive to said first pseudo-random sequence, a second voltage generator producing a periodic signal, and a comparator accepting the voltage responsive to the first pseudo-random sequence and the periodic signal, and from them producing a dither control signal to vary a duration of the sampling interval responsive to the dither control signal.

BRIEF DESCRIPTION OF THE DRAWINGS

Embodiments will be described with reference to the following drawings figures, in which like numerals represent like items throughout the figures, and in which:

FIG. 4A is block diagram of a receiver comprising a dithering removal circuit according to an embodiment of the invention.

FIG. 9 is a more detailed block diagram of the chaos generator of FIG. 2.

DETAILED DESCRIPTION OF THE INVENTION

Embodiments of the present invention are related to communication using signals designed to have LPI/LPD characteristics. In addition to a chaotically-generated sequence, an additional layer of robustness and increased energy density suppression is achieved by using an a priori known dithering mechanism to force the non uniform sampling of the chaotically-spread waveform. The usage of the dithering mechanism described herein is not limited to communication systems using chaotically-spread waveforms, but may also be practiced using conventional PN-spread waveforms. Likewise, the dithering can be controlled responsive to a PN sequence.

Communication System Architecture

Figure 1:
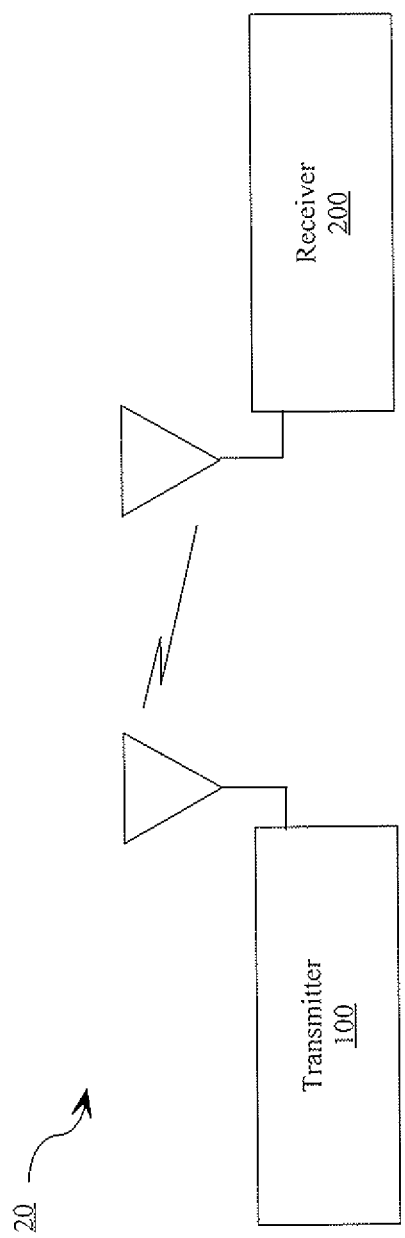
FIG. 1 is a block diagram of a coherent chaotic spread-spectrum communication system that is useful for understanding the present invention.

Referring now to FIG. 1, there is provided a block diagram of a coherent chaotic spread-spectrum communication system 20 that is useful for understanding the present invention. As shown in FIG. 1, communication system 20 comprises a transmitter 100 and a receiver 200. Transmitter 100 is configured to accept an amplitude-and-time-discrete signal and to spread the amplitude-and-time-discrete signal over a wide frequency band. The amplitude-and-time-discrete baseband signal may have already been spread by multiplication by, for instance, a chaotic sequence or a pseudo-random number sequence. Transmitter 100 is further configured to communicate analog chaotic signals to receiver 200 via a communications link.

Receiver 200, in steady-state conditions, knows the chaotic sequence a-priori and has acquired the temporal location within the chaotic sequence (i.e., the receiver 200 is time-synchronized to the chaotic sequence). Receiver 200 is then able to remove the chaotic sequence and demodulate information symbols from the remaining waveform. In contrast, an unintended receiver (not shown) does not know the chaotic sequence and is unable to remove. In effect, the unintended receiver (not shown) sees just a noise like signal having reduced peak spectral energy. The unintended receiver (not shown) is unable to remove the chaotic sequence or demodulate the information symbols.

According to an embodiment of the present invention provide, communications system 20 employs phase shift keying (PSK) symbols. However, the invention is not limited in this regard. Other types of phase shift keying symbols can be used without limitation.

Referring again to FIG. 1, transmitter 100 is configured to generate an output signal having chaotic properties, i.e., an output signal having its frequency spectrum varied over time. As such, communications system 20 has many advantages as compared to conventional spread-spectrum communications systems. Communications system 20 also has many advantages over chaos based spread spectrum systems utilizing analog based chaotic sequence generators. Communications system 20 corrects drift between a transmitter and a receiver without an extreme compromise of throughput.

Communication system 20 disclosed herein utilizes a coherent chaotic sequence spread spectrum (CCSSS) method. Prior to being transmitted, data symbols are combined with a higher rate chaotic sequence (analogous to the binary PN spreading sequence known as a chipping code in traditional direct sequence spread spectrum systems) that spreads the spectrum of the data according to a spreading ratio. Communication system 20 channel-encodes an IF carrier with information symbols, e.g., PSK symbols. The channel encoding is one of two operations commonly known as modulation. The other operation commonly known as modulation is mixing times a local oscillator or other sequence which results in frequency translation and also may be used herein.

Communication system 20 also modulates the phase modulated carrier at a rate in a chaotic manner utilizing a string of discrete time chaotic samples. The discrete time chaotic samples shall hereinafter be referred to as "chips". The rate at which phase modulated carrier is modulated by the chips shall hereinafter be referred to as a "chip rate" or a "chaos chip rate." Each chip period generally is a much shorter sample time interval than the period of each of the information symbols. Thus, it will be understood that the carrier is modulated using the chaotic sequence chips. Moreover, it will be understood that the chip rate associated with the chaotic sequence is much higher than the symbol rate. It should also be understood that the chaotic sequence of chips which are utilized for generating the transmitted signal is known a priori by receiver 200. Consequently, the same chaotic sequence can be used at receiver 200 to reconstruct the non-spread symbols or remove the effect of spreading at receiver 200.

The peak spectral characteristics of the transmitted signal, as seen by an unintended receiver (not shown), may be further suppressed by the intentional introduction of a dither into the transmitted signal. The dither may be based, for instance, on a discrete time chaos process. The dither may also be referred to herein as a sample time jitter.

Figure 2:
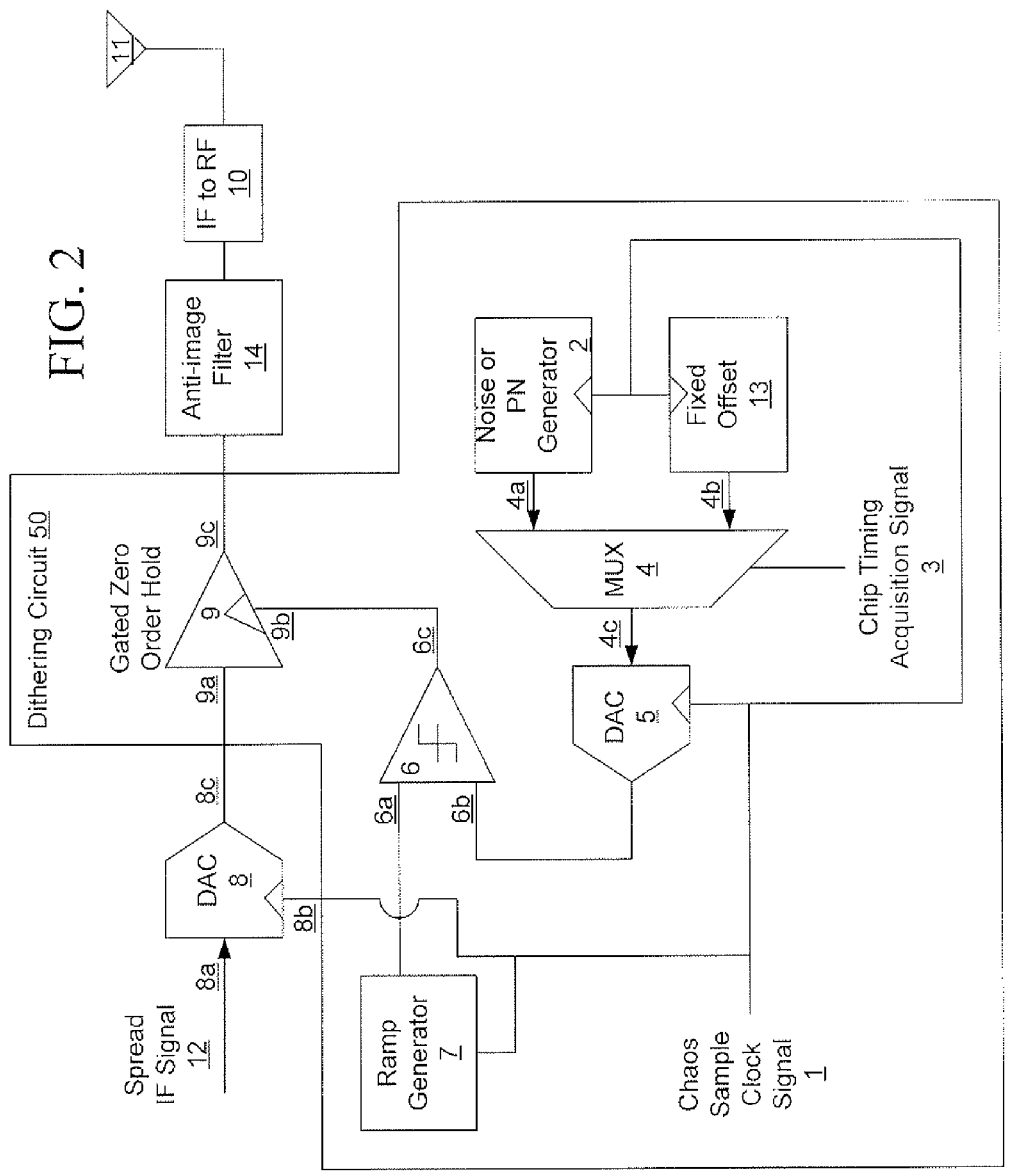
FIG. 2 is a block diagram of a transmitter comprising a dithering circuit according to an embodiment of the invention.

Referring now to FIG. 2, there is provided a block diagram of the sample dithering portion of a chaotic transmitter 100. Transmitter 100 has been selected to illustrate the introduction of continuous time chaos dither into the transmit side. In this regard, it should be understood that transmitter 100 comprises a digital to analog converter (DAC) 8, a dithering circuit 50, an anti-image filter 14, an IF to RF converter 10, and an antenna 11. Dithering circuit 50 is comprised of a chaos or pseudo-random number generator 2, a fixed offset source 13, a multiplexer (MUX) 4, a digital to analog converter (DAC) 5, a comparator 6, a ramp generator 7, and an external zero order hold (ZOH) 9.

DAC 8 is configured to receive an input chaotically spread IF signal 12 from a baseband or IF generating portion of a transmitter (not shown). DAC 8 is further configured for communicating analog signals to the dithering circuit 50. DACs are well known to those having ordinary skill in the art, and therefore will not be described herein. As should be understood, an IF signal is a time-varying waveform at a frequency different from the RF transmitted frequency. The spread IF signal 12 is a sequence of discrete time digital values of the IF signal (i.e., a digital IF spread spectrum signal) that has been channel encoded with information-bearing symbols (e.g., PSK symbols) at a symbol rate, and has been spectrally spread by a chaos chip sequence at a chaos chip rate. This spreading consists of multiplying the amplitude-and-time-discrete IF signal by a digital chaotic sequence. The product of this arithmetic operation is the spread IF signal 12. The spread IF signal 12 is also referred to herein as a digital chaotic signal. The spread IF signal is uniformly sampled (i.e., constant sampling interval).

Dithering circuit 50 is configured to dither the sample interval about the constant sample interval as the digital signal is converted to analog format. Embodiments of the invention may assume that off-the-shelf data converters are utilized. Embodiments of the invention may further assume that the data converters are implemented using Clocked Boolean Logic (CBL) and therefore preferably should receive stable and uniform interval clock for proper operation.

ZOH 9 is provided to overcome problems introduced by dithering a clock edge of a Clocked Boolean Logic (CBL) based system. ZOH 9 is configured to receive an analog signal from DAC 8 at input terminal 9a. ZOH 9 is also configured to hold a signal at output terminal 9c at a fixed value for each interval of a control signal received at input terminal 9b. The output signal of ZOH 9 over time resembles stair-steps of irregular width and height. ZOH 9 will be described in further detail below.

The output sample timing can be dithered as a positive or negative delay from the nominal clock edge albeit delayed. The architecture of FIG. 2 assumes that the spread IF signal 12 has been spread by a chaotic sequence using a chip rate clock (not shown) that is operating at the chaos chip rate.

As noted above, a chaos chip rate clock (not shown) is provided in transmitter 100. Chaos chip rate clock (not shown) is configured to synchronously generate a chaos sample clock signal 1. Chaos sample clock 1 operates at a rate (i.e., a multiple of the chaos chip rate) that is the same as the IF sample clock rate, with a period referred herein as the chaos sample period. The chaos chip rate is greater than the information symbol rate. The chaos chip rate clock (not shown) may be phase offset from the chaos sample rate clock (not shown) in order to avoid points in time at which the spread IF signal 12, 9a, 9c may be transitioning from one chip period to the next.

DAC 8 is configured for performing data conversions. Ramp generator 7, DAC 5 and comparator 6, are configured to create a dither control signal. Ramp generator 7, DAC 8, and DAC 5, noise or PN generator 2, fixed offset 13, and MUX 4 (not shown) are configured to receive a chaos sample clock signal 1 from a chaos clock (not shown). Generator 2 generates an independent chaotic or PN sample stream at the chaos clock rate. As such, these components 7, 8, 5, 2, 4, 13 derive timing from chaos sample clock (not shown).

Generator 2 is configured to provide a sequence of digital noise values that are to be used by comparator 6 to generate the dither control signal. The term "Noise", as used herein in the context of the generator 2, may be a chaotic process that deterministically generates chaotic samples or a pseudo-random process that generates PN samples having various probability distributions.

According to an embodiment of the present invention, the sequence of random numbers and the chaotic spreading sequence used to form spread IF signal 12 are generated by the same chaos generator with differing state indices or differing distributions. The invention is not limited in this regard. For example, different chaos generators can be used to generate the sequence of random numbers and the chaotic spreading sequence used to form the spread IF signal 12.

Generator 2 is configured to generate a chaotic number sequence or a psuedo-random number sequence. Each of the output values of generator 2 can have a uniform probability density within a known, fixed range. Each of the output values of generator 2 can also have a non-uniform probability density.

Fixed offset 13 is configured to provide a fixed digital value which is supplied to the DAC 5 during the chip timing acquisition period in order to generate a constant clock period to the ZOH 9. Each of the output values of the fixed offset 13 is an identical digital value. The fixed offset 13 can be implemented as a loadable register or hard wired values.

MUX 4 has input terminals 4a, 4b and output terminal 4c. MUX 4 is configured to select as its input 4a the signal output from generator 2 or 4b the output from the fixed offset 13 based on whether the system and in particular the receiver is in acquisition mode or steady state mode. MUX 4 is configured to select as its input 4b during a time period in which chaos chip acquisition takes place. In effect, a stable value is provided at the output of MUX 4, 4c thus preventing sample clock dither. The output of the MUX 4 is a digital value. The digital value can correspond to the digital value from generator 2 when input 4a is enabled. The digital value can have a predetermined fixed value when input 4b is enabled. The chip timing acquisition signal 3 is an input select signal.

MUX 4 is configured to communicate digital values 4c to DAC 5. DAC 5 is configured to convert received digital values into output voltages. DAC 5 is clocked by chaos sample clock 1. DAC 5 is also configured to read a digital value from MUX 4 once per period of chaos clock signal 1. DAC 5 is further configured to hold stable the output voltage corresponding to the digital value from MUX 4. The output voltage from DAC 5 is stable only for one period of the chaos sample clock signal 1. The output voltage from DAC 5 is generally different for a next period of the chaos sample clock signal 1 during steady state mode (MUX 5 input 4a selected) when a new digital value is received from the output of MUX 4. The output of DAC 5 forms an analog discrete-value dither reference waveform. DAC 5 is operable through at least a DAC 5 voltage range. All components clocked with the chaos clock 2, 4, 5, 7, 8, 13 use the clock at phases required for the appropriate clocked Boolean logic registration (not shown).

Comparator 6 has an input terminal 6a, a reference input terminal 6b, and an output terminal 6c. The operating characteristic of comparator 6 is that an input voltage is provided at the input terminal 6a and a reference voltage is provided at the reference input terminal 6b. The voltage at output terminal 6c is high if the voltage at input terminal 6a is greater than the voltage at reference input terminal 6b. Conversely, the voltage at output terminal 6c is low if the voltage at input terminal 6a is less than the voltage at reference input terminal 6b. The output of comparator 6 forms a dither clock signal having a plurality of edges, alternating between a leading edge and a trailing edge, such that the points in time of each of the leading edges of the clock signal are responsive to the respective dither sample. The point in time of the trailing edge is determined by the end of a cycle of a ramp voltage from ramp generator 7. The dither clock must be in a low voltage state for a minimum duration dictated by the characteristics of the input hold circuit of the sample and hold 9. This minimum low voltage state can be achieved by a number of techniques know to those skilled in the art and thus shall not be described in detail herein. These techniques can include offsetting the phase of the ramp generator, adding a bias to the reference signal, limiting the range of the reference signal to be less than the range of the ramp, or combinations thereof.

Ramp generator 7 provides a ramp voltage at input terminal 6a of comparator 6. The ramp voltage has a period equal to the chaos sample clock period. The output voltage of DAC 5 provides the voltage at reference input terminal 6b of comparator 6. The output voltage from DAC 5 is generally different for each chaos chip period when MUX 4 selects input 4a to route to output 4c. However, the output voltage from DAC 5 is generally a predetermined fixed value when MUX 4 selects input 4b to route to output 4c. Ramp generator 7 has a voltage range that is at least as large as the voltage range of DAC 5. Ramp generator 7 and comparator 6 are configured to convert the variable voltage provided by DAC 5 to a signal having a variable point in time at which the voltage transitions from a low voltage to a high voltage. The point in time varies with respect to edges of the chaos clock signal 1. The variable point in time may be referred herein as a variable edge time. The time at which the signal at output terminal 6c transitions from a high voltage to a low voltage is determined by the high to low transition of the ramp voltage at input terminal 6a. The signal at output terminal 6c has an average period substantially the same as the chaos clock signal 1. However, the length of time of individual periods of the signal at the output terminal 6c will vary depending on the transition times produced by comparator 6.

A spread intermediate frequency ("IF") signal is provided at input terminal 8a of DAC 8. The IF signal shown herein is a relatively low-frequency time-varying waveform. The spread IF signal 12 is a sequence of digital values of the IF signal that has been channel encoded to form information-bearing symbols (e.g., PSK symbol) at a symbol rate, and has been further modulated by a chaos chip sequence at a chaos chip rate. The chaos chip rate is greater than the symbol rate. DAC 8 is configured to convert the digital value to a voltage value at a time determined by an edge of the chaos clock signal 1. The signal at output terminal 8c is an analog discrete-value signal. The rate of the chaos sample clock signal 1 is consistent with the chaos chip rate in the context of the Nyquist sampling theorem. In practical implementations the conversion rate is four times or greater the actual chaos chip rate and the sampling rate is raised via interpolation filtering (not shown). In the current invention a higher sampling rate is typical because of the required wider bandwidth of the anti-image filter 14 (a.k.a. smoothing filter) as a result of sample time edge dithering. The phase of the chaos clock signal 1 may be offset from the phase of the sampled chaos sequence consistent with standard CBL design practices so that the conversion by DAC 8 is performed at a time when the signal at input terminal 8a is relatively stable.

DAC 8 is configured to provide analog discrete-value signals to ZOH 9 via an input terminal 9a. The output signal of comparator 6 is provided as an input signal to ZOH 9 via input terminal 9b. ZOH 9 is configured to provide, at output terminal 9c of ZOH 9, an analog voltage corresponding to the analog voltage at input terminal 9a at a time determined by the transition of the signal presented at the input terminal 9b. The voltage at the output terminal 9c is held constant during the time interval in between low voltage to high voltage transitions at the input terminal 9b.

The voltage at output terminal 9c of ZOH 9 is provided as an input to anti-image filter 14. Anti-image filter 14 removes the spectral replicas of ZOH output 9c to form a non time and amplitude discrete version of the analog waveform. The function of anti-image filter 14 is substantially similar to that of an anti-image filter in fixed sampling interval applications. Spectral images in fixed sample interval applications are periodic replicas of the signal's fundamental spectrum whereas spectral images in this dithered interval application have characteristics of Bessel function expansion. The function of anti-image filters are well known to those skilled in the art and will not be discussed in detail here.

The signal at the output of anti-image filter 14 is provided as input to IF-to-RF convertor 10. IF-to-RF convertor 10 is configured to translate in frequency a relatively low-frequency IF signal up to a transmitted RF signal. Apparatus and methods for performing IF-to-RF conversions are well known to persons having ordinary skill in the art of RF transmitter design, and therefore will not be described herein. IF-to-RF convertor 10 is configured to communicate RF signals to antenna 11 for broadcast to a desired receiver.

Figure 3:
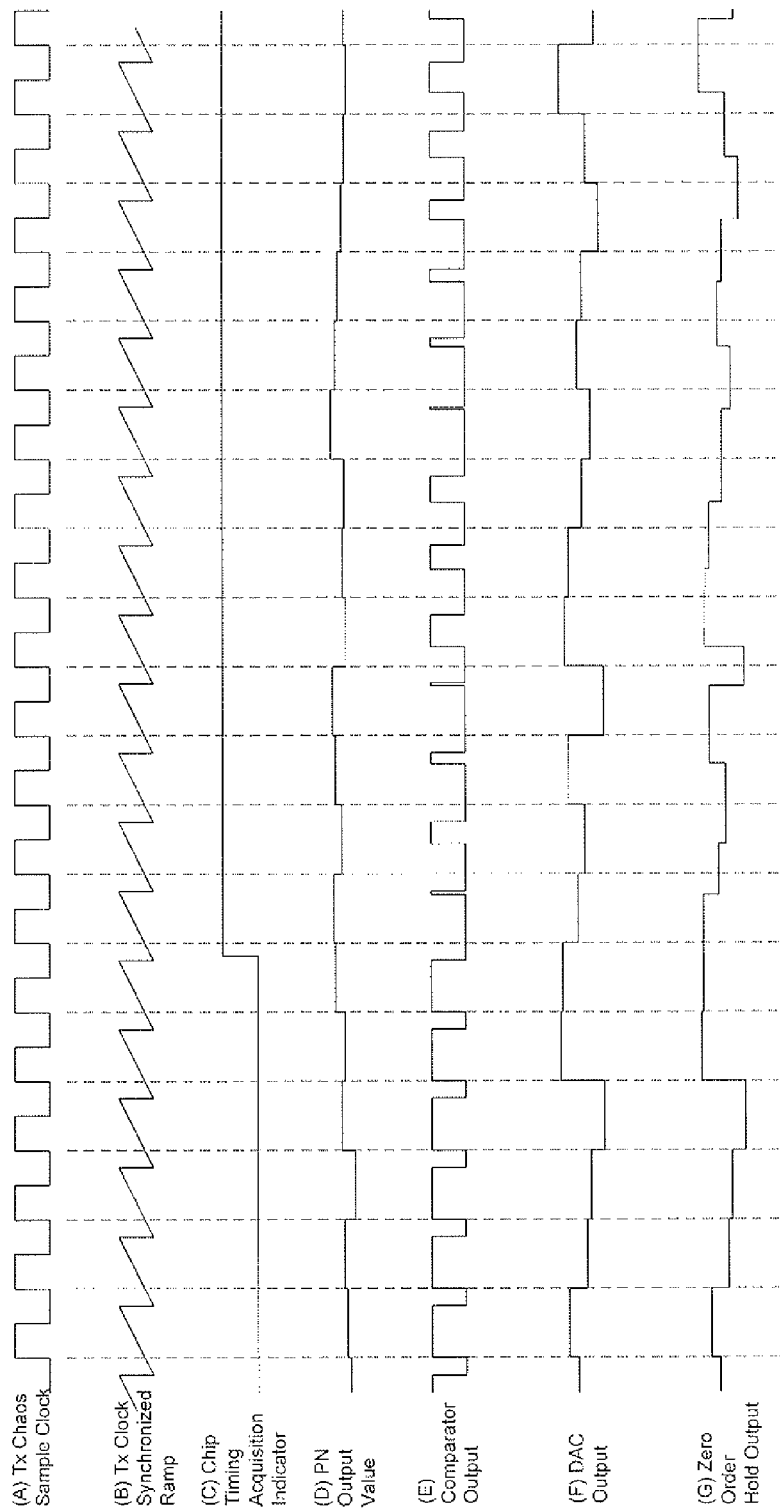
FIG. 3 is a timing diagram of points within the transmitter of FIGS. 1-2.

Referring now to FIG. 3, there is provided a timing diagram of points within transmitter 100 that is useful for understanding the present invention. It should be noted that the timing diagram is not to scale unless noted otherwise, and certain features (e.g., timing delay through the DACs and the deviations from nominal sample times) are exaggerated for illustration purposes. Illustration of the waveforms assumes all actions are based on the rising edge of clocks, but the circuit could also be designed to assume actions are based on the falling edge of clocks.

Waveform (A) is an exemplary chaos sample clock signal 1. A complete cycle of the chaos sample clock signal 1 is formed by a high and low portion. The chaos sample clock signal 1 has the same period as the IF sample clock (not shown in FIG. 2) that is synchronous to the clock used to produce the spread IF signal 12. The chaos sample clock signal 1 is preferably the IF sample clock (not shown in FIG. 2).

Waveform (B) is an exemplary output signal provided by ramp generator 7. Each cycle of waveform (B) is substantially of the same duration. Cycles of waveform (B) are synchronous with and phase offset with cycles of the chaos sample clock signal 1 represented by waveform (A).

Waveform (C) is an exemplary of the chip timing acquisition signal 3. This is a control signal which enables sample time dithering after a period of time sufficient to guarantee that the receiver has acquired timing lock.

Waveform (D) is an exemplary signal provided by generator 2. Although generator 2 provides digital values, it will be understood that waveform (D) represents an analog representation of the digital values provided by generator 2 by way of DAC 5 when MUX 4 selects the chaos or PN generator 2 output as its input. Each cycle of waveform (D) is substantially aligned with cycles of the chaos sample clock signal 1 represented by waveform (A).

Waveform (E) is an exemplary comparator output signal provided at output terminal 6c of comparator 6. Waveform (E) transitions from low to high at a point in time at which the ramp voltage shown in waveform (B) equals or exceeds the voltage shown in waveform (D). High to low transitions occur at a point in time when the ramp voltage of waveform (B) transitions to its initial cycle value.

Waveform (F) is an exemplary analog signal provided at the output of DAC 8. DAC 8 is clocked by the chaos sample clock signal 1, waveform (A). The output of DAC 8 may change value at the same time as each cycle of waveform (A).

Waveform (G) depicts the analog data at output terminal 9c of ZOH 9. The analog value changes at each low-to-high transition of waveform (F) presented at input terminal 9b of ZOH 9. The analog value is held steady at that value until the next transition of waveform (F). The value taken by output terminal 9c is the value present at the input 9a of the ZOH 9 at the time of the transition.

The chaos sample clock signal 1 shown in waveform (A) and the IF sample clock signal (not shown in FIG. 2) will be at the same rate but may have a phase offset. The phase offset, if present, would enable applying dither as either a positive or negative timing offset. Without the phase offset, the dither would be applied as a timing offset in only one direction (positive or negative). In either case the output of DAC 8 may need to be buffered. For instance, if a phase offset is used, then the leading edge of the dither clock signal provided at output terminal 6c from comparator 6 may be offset (lag) 180 degrees (i.e., a half-cycle) from the leading edge of a DAC clock (not shown in FIG. 2). In this manner, the output of DAC 8 is a stable value when communicated to ZOH 9.

Referring now to FIG. 4A, there is provided a block diagram of receiver 200 that is useful for understanding the present invention. Receiver 200 illustrates the removal of dither from the receive side and recovery of the transmitted signal. As such, receiver 200 is comprised of an antenna 111, an RF-to-IF convertor 110, a dithering removal circuit 250, an anti-alias filter 114, and an analog to digital convertor (ADC) 108. Dithering removal circuit 250 is generally configured to sample a received signal at the same intervals that transmitter 100 converted it to a dithered signal, and then to present the received signal as a uniformly sampled signal. In this regard, it should be understood that dithering removal circuit 250 is comprised of a chaos or pseudo-random number sequence generator 102, a fixed offset circuit 113, a multiplexer 104, a digital to analog (DAC) convertor 105, a comparator 106, a ramp generator 107, and an external sample and hold (SH) device 109.

In order to synchronize transmitter 100 and receiver 200, all time dithering is turned off during a preamble or periodic amble times synchronized with transmitter 100. This period of time is known as a chaos chip acquisition period. Timing synchronization is achieved using standard synchronization techniques. After a period of time known a priori, chaos chip timing synchronization between transmitter 100 and receiver 200 is attained with a high probability. Transmitter 100 and receiver 200 start their identical dithering circuits in the same state.

Antenna 111 is configured to receive signals transmitted from transmitter 100. Antenna 111 is also configured to communicate received signals to RF-to-IF convertor 110. RF-to-IF convertor 110 is configured to translate in frequency a relatively high-frequency RF signal to a different frequency IF signal. In the present embodiment, the IF signal is at or near baseband. The IF signal need not be at the same IF frequency as that of the IF signal in transmitter 100. Apparatus and methods for performing RF-to-IF conversions are well known to persons having ordinary skill in the art of RF receiver design, and therefore will not be described herein.

The output of the RF-to-IF converter 110 is passed to the input of anti-alias filter 114. The anti-alias filter 114 removes all frequencies which would alias in the continuous time to discrete time conversion process of the sample and hold 109. The bandwidth requirements on the anti-alias filter 114 take into account the expanded bandwidth of a dithered signal. Apparatus and methods for performing anti-alias filtering are well known to persons having ordinary skill in the art of mixed signal design, and therefore will not be described herein.

Receiver 200 can comprise a chaos sample clock (not shown). Chaos sample clock (not shown) is configured to generate a chaos sample clock signal 101. Chaos sample clock (not shown) operates at an integer multiple of the chaos chip rate. Chaos sample clock (not shown) is also configured to communicate chaos clock signals 101 to ramp generator 105, noise or PN generator 102, fixed offset circuit 113, ADC 108, and DAC 105.

Noise or PN generator 102 generates a chaotic noise or a PN function, wherein both the chaotic noise and PN function provide a series of chaotic or pseudorandom digital values within a known, fixed range. Noise or PN generator 102 is configured to provide a sequence of digital values used via DAC 105 and competitor 106 as a dithered clock. The term "Noise", as used herein in the context of generator 102, refers to a chaotic process that deterministically generates chaotic samples having various probability distributions efficiency with potentially extremely long repetition periods.

According to an embodiment of the invention, the sequence of digital values and the chaotic spreading sequence used to form the spread IF signal 112 are generated by the same chaos generator with a temporal offset. The invention is not limited in this regard. For example, the sequence of digital values and the chaotic spreading sequence can be generated by different chaos generators.

Anti-alias filter 114 is configured to communicate IF signals to SH device 109 via input terminal 109a. SH device 109 is provided externally because commercially available ADCs do not have the S&H clock control out of the ADC on a separate pin. The S&H clock control of such commercially available ADCs is under the control of the device clock. A clocking signal is provided at the clock input terminal 109b of SH device 109. SH device 109 is configured to accept a time-varying voltage at input terminal 109a. SH device 109 is also configured to sample the value of this time-varying value at a time determined by a transition of the clocking signal received at input terminal 109b. SH device 109 is further configured to hold a constant voltage at an output terminal 109c until a next transition of clocking signal received at input terminal 109b. SH device 109 is configured to sample input waveforms at a time delayed from the time at which transmitter 100 output the waveforms. The delay may arise, for instance, from an RF propagation delay between transmitter 100 and receiver 200. The delay is calculated during the synchronization period. Accurate receiver timing is preferable, in order to improve the probability that each received sample is present when the constant interval sample time of ADC 108 triggers ADC 108 to sample SH device 109.

The sampled analog output voltage at output terminal 109c is provided at input terminal 108a of ADC 108. ADC 108 is configured to convert analog voltage values to digital values at a time determined by a transition of chaos sample clock signal 101. ADC 108 is also configured to communicate digital values to subsequent devices (not shown) of receiver 200. The subsequent device (not shown) are configured for processing the digital values to remove the chaos chip sequence and demodulate information symbols. The rate of the chaos sample clock signal 101 is substantially the same as the IF sample clock signal (not shown in FIG. 4A).

Generator 102 generates chaotic noise or a PN function, wherein both the noise and PN function provide a sequence of digital values within a known, fixed range, similar to the purpose of generator 2. According to an embodiment of the invention, the random number sequence and the chaotic sequence used to de-spread the spread IF signal 112 is generated by the same chaos generator with each sequence having a different temporal offset. The invention is not limited in this regard. For example, the random number sequence and the chaotic sequence are generated by different chaos generator. In either embodiment, generators 2, 102 are synchronized to use the same sequence of digital values for the introduction and removal of dither, respectively, and to synchronize the time at which dither is applied and removed.

The synchronization of generators 2, 102 may be achieved, in one embodiment, in a full duplex system by a handshaking protocol that is used to activate the dither in both the transmitter 100 and receiver 200. In another embodiment, transmitter 100 assumes that receiver 200 acquires timing lock of the chip spreading sequence after some a priori known number of preamble symbol times (during which the dither is inhibited) and initializes generators 2, 102 on an a priori known preamble or header field. After enough of the preamble has transmitted in order to meet a worst case acquisition time of receiver 200, a plurality of header symbols can be transmitted in overhead symbols. Furthermore, overhead symbols are may be time-division multiplexed with data symbols. The overhead symbols are multiplexed at know intervals to inform receiver 200 of the state of the transmitter 100 dither. The header symbols can inform receiver 200 to start dithering operations immediately. The header symbols can also inform receiver 200 to start dithering operations at a predetermined time and for a predetermined duration.

The pseudorandom digital word from generator 102 can have a uniform probability density within the known, fixed range. The pseudorandom digital word can also have a non-uniform probability density. Fixed offset circuit 113 is configured to provide a fixed digital value which is supplied to the DAC 105 during the chip timing acquisition period to generate a constant clock period to the sample and hold 109. Each of the output values of the fixed offset circuit 113 is an identical digital value. The fixed offset circuit 113 can be implemented as a loadable register or hard wired values.

Multiplexer (MUX) 104 is configured to select the output from noise or PN generator 102 via input terminal 104a or the output of fixed offset circuit 113 via input terminal 104b based on an amble present signal 103. MUX 104 is configured to select the signal from fixed offset circuit 113 when the amble is present in order to provide a stable value at the output terminal 104c of MUX 104. The amble present signal 103 may be synchronized with the chip timing acquisition signal 3 using the methods presented above. The output of MUX 104 when the amble present signal 103 is not active is a series of chaotic noise or pseudorandom digital words which change once per period of the chaos sample clock signal 101. When the amble present signal 103 is active, the output MUX 104 is held at a constant value that does not change from one chip sample period to another. The preset fixed offset value from fixed offset circuit 113 causes DAC 105 to produce an analog voltage near the center of the voltage range produced by ramp generator 107.

MUX 104 is configured to communicate output values on terminal 104c to DAC 105 via an input terminal 105a. Chaos sample clock (not shown) is configured to communicate the chaos sample clock signal 101 to DAC 105 via input terminal 105b. The chaos sample clock signal 101 is synchronized to the chaos chip sample time. DAC 105 is configured to receive a digital word from MUX 104 once per transition of the chaos sample clock signal 101. DAC 105 is also configured to convert the digital word to an analog voltage. DAC 105 is further configured to hold that analog output voltage constant until a next transition of the chaos sample clock signal. The output voltage value is generally different for the next period of the chaos sample clock signal 101 when a new digital word is received from the output of MUX 104. DAC 105 is operable at least through a voltage range of DAC 105.

Chaos sample clock (not shown) is also configured to communicate the chaos sample clock signal 101 to ramp generator 107 via input terminal 107a. Ramp generator 107 is configured to produce a ramp voltage. The ramp voltage has a period equal to the chaos chip sample period. Ramp generator 107 has a voltage range that is at least as large as a voltage range of DAC 105.

DAC 105 is configured to communicate output signals to comparator 106 via input 106b. Ramp generator 107 is configured to communicate output signals to comparator 106 via an input terminal 106a. Comparator 106 is configured to convert the variable voltage provided by DAC 105 to a signal having a variable point in time at which the voltage transitions from a low voltage to a high voltage. The point in time is variable with respect to edges of the chaos sample clock signal 101. The variation of the point in time is derived from generator 102 or fixed offset circuit 113. Comparator 106 is the same as or substantially similar to comparator 6. As such, the description provided above in relation to comparator 6 is sufficient for understanding comparator 106. However, it should be understood that the transition time of the signal from high to low is determined by the high to low transition of ramp voltage received at input terminal 106a. The signal at output terminal 106c has an average period substantially the same as the chaos chip sample rate. The length of time of individual periods of the signal at output terminal 106c will vary depending on the transition times produced by comparator 106.

The effect of the dither is to introduce a chaotic or pseudo-random jitter on the timing of each chaos chip sample. This imparts phase noise onto the RF spectrum, as seen by a receiver which does not know the sequence produced by generator 2 and therefore cannot remove the dither. The phase noise acts to further spread the spread spectrum signal and further suppress any cyclostationary properties of the transmitted signal. The analysis and effect of phase noise upon RF signals is well known to persons having ordinary skill in the art.

In steady state conditions, after the chip acquisition time and after the dither acquisition time, generator 102 is synchronized with generator 2. Receiver 200 is able to remove the effect of dither. However, an unintended receiver (not shown) generally will not know the chaos chip sequence and/or the dither sequence. As such, the unintended receiver (not shown) receives a chaos-chip spread RF signal having a large amount of phase noise. This makes the signal highly undetectable. If the signal is detected by an unintended receiver, then because the unintended receiver (not shown) knows the chaos chip sequence but not the dither sequence, the unintended receiver (not shown) can experience a high level of phase noise. The high level of phase noise makes it difficult to demodulate information symbols at an acceptable bit error rate.

Figure 4B:
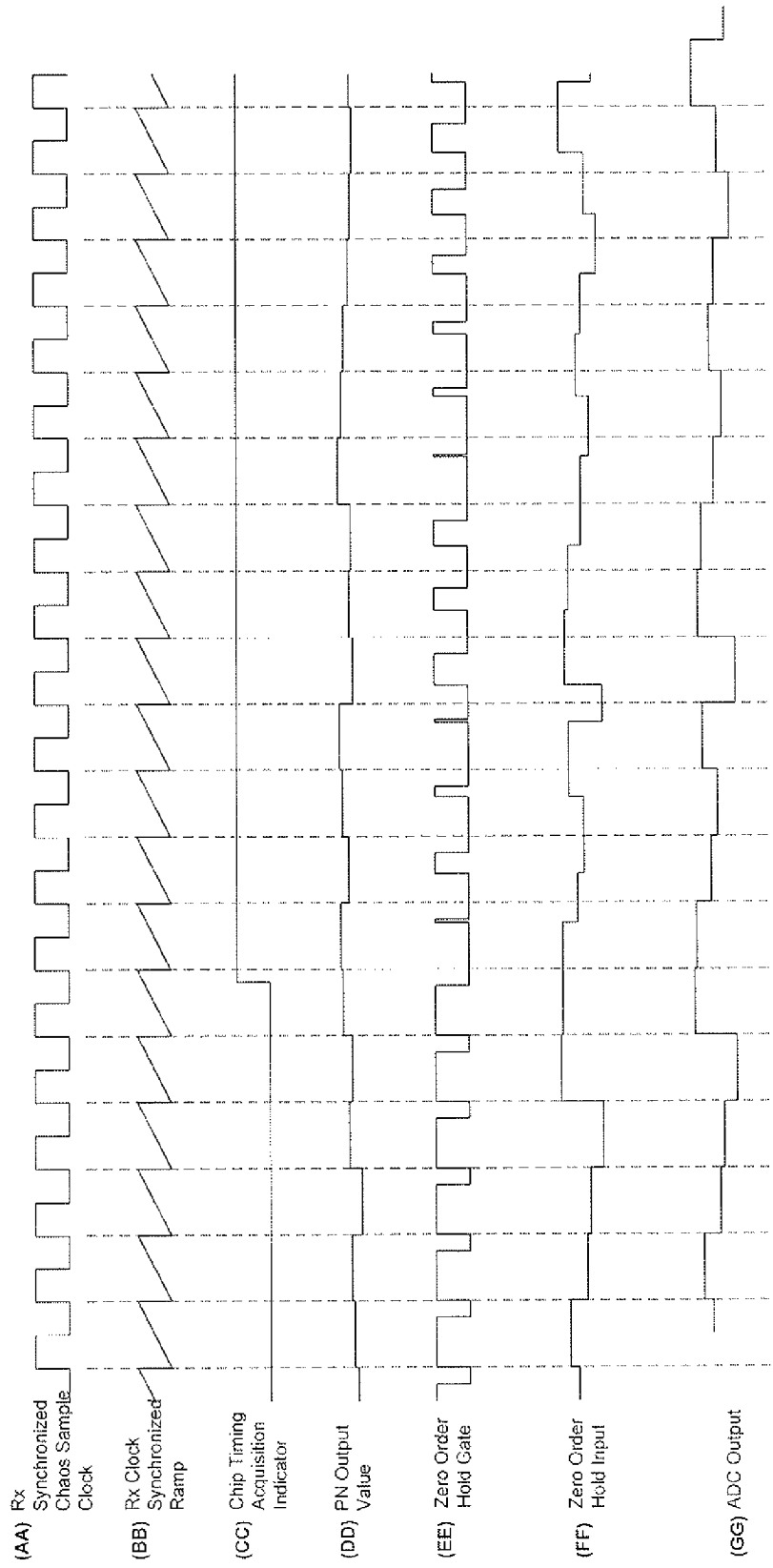
FIG. 4B is a timing diagram of points within the receiver of FIG. 4A.

FIG. 4B illustrates the timing of signals at various points within receiver 200 of communication system 20. It should be noted that the illustration is not to scale unless noted otherwise, and certain features (e.g., timing delay through the ADC 108 and the deviations from nominal sample times) are exaggerated for illustration purposes. Illustration of the waveforms assumes all actions are based on the rising edge of clocks, but the circuit could also be designed to assume actions are based on the falling edge of clocks.

Waveform (AA) is an exemplary synchronized chaos sample clock used to clock the chaotic chipping samples of the spread IF signal 112 (hereinafter, "IF sample clock"), the IF signal being depicted in FIG. 4A. A complete cycle of the IF sample clock is formed by a high and low portion. The IF sample clock has the same period as the chaos sample clock signal 101 and preferably is aligned with the chaos sample clock signal 101.

Waveform (BB) is an exemplary ramp generator 107 output within receiver 200. The ramp generator 107 provides an analog output that increases during each cycle of the chaos sample clock signal 101 until it is reset to a value of zero on the onset of a new cycle of the chaos sample clock signal 101 by a reset mechanism (not shown). Each cycle of waveform (BB) is substantially of the same duration, and cycles of waveform (BB) coincide with cycles of the chaos sample clock 101 in waveform (AA).

Waveform (CC) is an exemplary of the amble present signal 103 of FIG. 4A. This is a control signal which enables removal of the sample time dithering after a period of time sufficient to guarantee that the receiver 200 has acquired timing lock. Preferably, the amble present signal 103 is aligned with the chip timing acquisition signal 3.

Waveform (CC) in an exemplary of the amble present signal 103 of FIG. 4A. The amble present signal 103 is a logical low voltage during an a priori determined period of time representing the worst case amount of time required for the receiver to synchronize chip and symbol timing. The amble present signal 103 then transitions to a logical high voltage and remains in that state during steady state operation. While the chip amble present signal 103 is in a logical high voltage state, MUX 104 of FIG. 4A selects Noise or PN Generator 102 as the input to be routed to its output. While the chip amble present signal 103 is in a logical low voltage state, MUX 104 of FIG. 4A selects the Fixed Offset 113 as the input to be routed to its output.

Waveform (DD) is an exemplary Noise or PN generator output signal value, i.e., the signal value provided by the generator 102. Although the generator 102 provides digital values in binary form, it will be understood that waveform (DD) represents a numeric representation of the binary values provided by the generator 102. Each cycle of waveform (DD) is substantially aligned with cycles of the chaos sample clock 101 depicted in waveform (AA).

Waveform (EE) is an exemplary signal provided at the output of the comparator 106, which is used as a gating signal for the sample and hold 109. The waveform (EE) transitions from a logical low to a logical high at the point in time at which the value of output of Ramp Generator 107 shown in waveform (BB) equals or exceeds the value of the output of DAC 105. When the Amble Present signal 103 shown in waveform (CC) is low, the output of DAC 105 is a fixed value, producing fixed times of transition in waveform (EE) relative to the chaos sample clock shown in waveform (AA). When the Amble Present signal 103 shown in waveform (CC) is high, the output of DAC 105 has a value that changes with each period of the chaos sample clock signal 101, depending upon the value produced by generator 102. The output of comparator 106 has a logical high value when the value of the output of Ramp Generator 107 equals or exceeds the value of DAC 105, as shown in waveform (EE). Waveform (EE) remains high until the start of the next chaos sample clock period when the Ramp Generator 107 is reset.

Waveform (FF) is an exemplary signal presented to the input of sample and hold 109, and still incorporating dithering.

Waveform (GG) is an exemplary representation of the digital signal provided at the output of the ADC 108. The output of ADC is clocked at regular intervals determined by chaos sample clock signal 101, the dither having been removed by the clocking of sample and hold 109.

The dotted vertical lines of FIG. 4B show the nominal chaos output sample times. This illustrates the points in time at which the edges of the output from ADC 108 would take place without the continuous time chaos dithering on the received signal.

Figure 5:
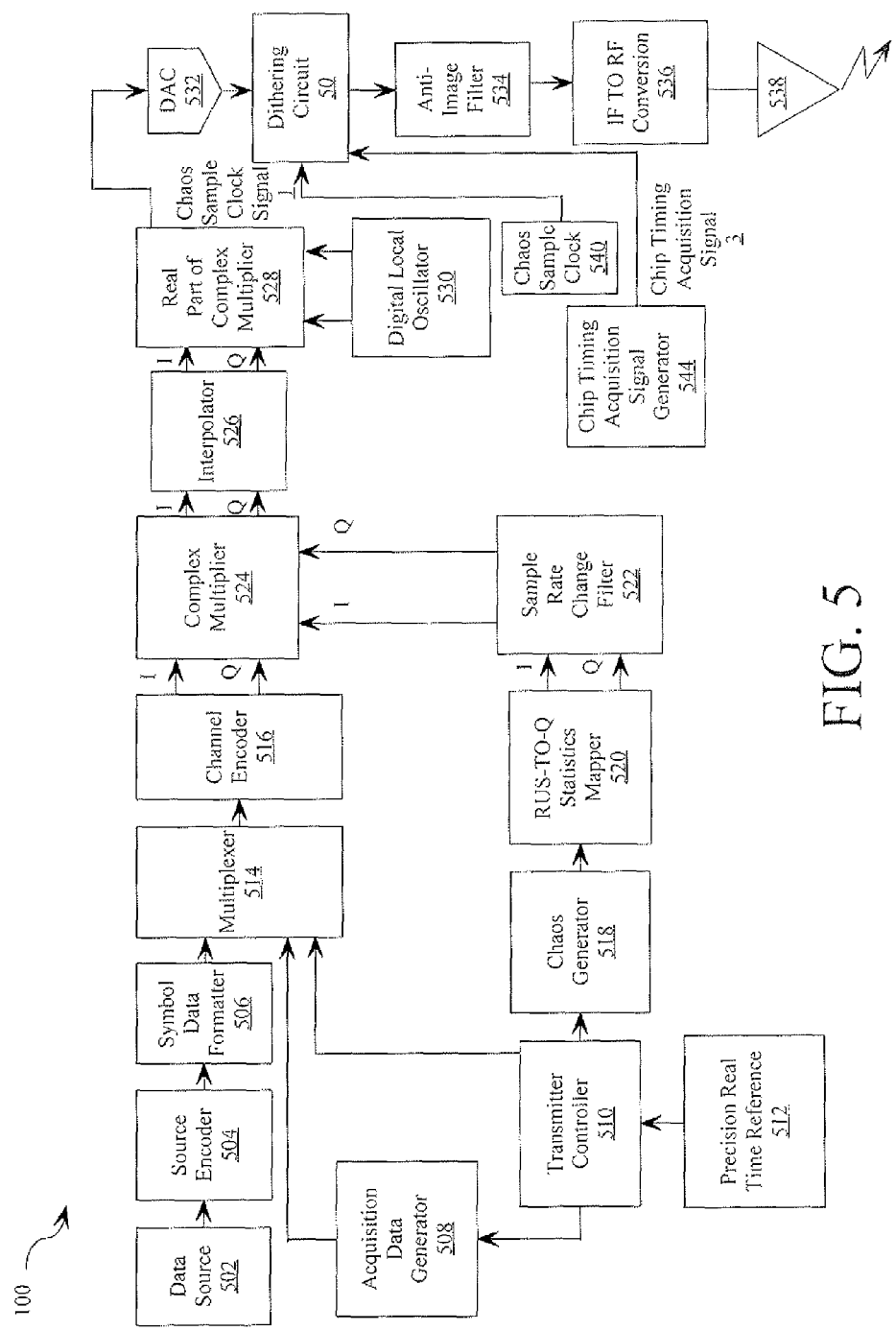
FIG. 5 is a more detailed block diagram of the transmitter of FIGS. 1-2.

Referring now to FIG. 5, there is provided a more detailed block diagram of transmitter 100 that is useful for understanding the invention. It should be noted that the embodiment of FIG. 5 assumes that: (1) a low order phase shift keying (PSK) data modulation is used; (2) no pulse shaping is applied to data symbols; (3) Channel encoded data symbols are generated in quadrature form; and (4) chaotic spectral spreading is performed at an intermediate frequency (IF).

Referring again to FIG. 5, transmitter 100 is comprised of a data source 502. Transmitter 100 is also comprised of a source encoder 504, a symbol data formatter 506, an acquisition data generator 508, a transmitter controller 510, a multiplexer 514, a channel encoder 516, a precision real time reference 512, and a digital complex multiplier 524. Transmitter 100 is further comprised of a chaos generator 518, a real uniform statistics to quadrature Gaussian statistics mapper device (RUQG) 520, and a sample rate change filter (SRCF) 522. Transmitter 100 is further comprised of an interpolator 526, a digital local oscillator (LO) 530, a real part of a complex multiplier (RPCM) 528, a digital-to-analog converter (DAC) 532, a dithering circuit 50, a chaos sample clock 540, a chip timing acquisition signal generator 544, an anti-image filter 534, an intermediate frequency (IF) to radio frequency (RF) conversion device 536, and an antenna element 538. Each of the above listed components 502-516, 520-538 are well known to persons having ordinary skill in the art. Thus, these components will not be described in detail herein. However, a brief discussion of the transmitter 100 architecture is provided to assist a reader in understanding the present invention.

Referring again to FIG. 5, data source 502 is configured to receive bits of data from an external data source (not shown) as bits of data. In this regard, it should be appreciated that data source 502 is an interface configured for receiving an input signal containing data from an external device (not shown). Data source 502 is further configured to supply bits of data to source encoder 504 at a particular data transfer rate. Source encoder 504 can be configured to encode the data received from the external device (not shown) using a forward error correction coding scheme. The bits of data received at or generated by source encoder 504 represent any type of information that may be of interest to a user. For example, the data can be used to represent text, telemetry, audio, or video data. Source encoder 504 is further configured to supply bits of data to symbol data formatter 506 at a particular data transfer rate.

Symbol data formatter 506 is configured to process bits of data for forming channel encoded symbols. In a preferred embodiment, the source encoded symbols are phase shift keyed (PSK) encoded. If it is desired to use a non-coherent form of PSK with the coherent chaos spread spectrum system, then symbol data formatter 506 can also be configured to differentially encode formed PSK symbol data words. Differential encoding is well known to persons having ordinary skill in the art, and therefore will not be described herein. Symbol data formatter 506 can be further configured to communicate non-differentially encoded PSK symbol data words and/or differentially encoded PSK symbol data words to multiplexer 514. Still, the invention is not limited in this regard.

According to an embodiment of the invention, symbol data formatter 506 is functionally similar to a serial in/parallel out shift register where the number of parallel bits out is equal to log base two ($\log_2$) of the order of channel encoder 516. In this regard, symbol data formatter 506 is selected for use with a quadrature phase shift keying (QPSK) channel encoder. As such, symbol data formatter 506 is configured to perform a QPSK data word formatting function for grouping two (2) bits of data together to form a QPSK symbol data word (i.e., a single two bit parallel word). Thereafter, symbol data formatter 506 communicates the encoded QPSK symbol data word to multiplexer 514. Still, the invention is not limited in this regard.

According to another embodiment of the invention, symbol data formatter 506 is functionally similar to a serial in/parallel out shift register where the number of parallel bits out is equal to log base two ($\log_2$) of the order of channel encoder 516. In this regard, symbol data formatter 506 is selected for use with a binary phase shift keying (BPSK) modulator. As such, symbol data formatter 506 is configured to map one bit of data to a BPSK symbol data word. Thereafter, symbol data formatter 506 communicates the BPSK symbol data word to multiplexer 514. Still, the invention is not limited in this regard.

According to another embodiment of the invention, symbol data formatter 506 is selected for use with a sixteen quadrature amplitude modulation (16QAM) modulator. As such, symbol data formatter 506 is configured to map four (4) bits to a 16QAM symbol data word. Thereafter, symbol data formatter 506 communicates the 16QAM symbol data word to multiplexer 514. Still, the invention is not limited in this regard.

According to another embodiment of the invention, symbol data formatter 506 is selected for use with a binary amplitude shift keying (ASK) modulator. As such, symbol data formatter 506 is configured to map one bit of data to a ASK symbol data word. Thereafter, symbol data formatter 506 communicates the ASK symbol data word to multiplexer 514. Still, the invention is not limited in this regard.

Transmitter 100 also includes an acquisition data generator 508 capable of generating a "known data preamble" that can be used to enable initial synchronization of a chaotic sequence generated in transmitter 100 and receiver 200. The duration of this "known data preamble" is determined by an amount required by receiver 200 to synchronize with transmitter 100 under known worst case channel conditions. In some embodiments of the invention, the "known data preamble" is a repetition of the same known symbol. In other embodiments of the invention, the "known data preamble" is a series of known symbols. Acquisition data generator 508 can be further configured to communicate the "known data preamble" to multiplexer 514.

Referring again to FIG. 5, multiplexer 514 is configured to receive the binary word to be modulated by channel encoder 516 from symbol data formatter 506. Multiplexer 514 is also configured to receive a "known data preamble" from acquisition data generator 508. Multiplexer 514 is coupled to transmitter controller 510. Transmitter controller 510 is configured to control multiplexer 514 so that multiplexer 514 routes the "known data preamble" to channel encoder 516 at the time of a new transmission.

According to an alternative embodiment of the invention, the "known data preamble" is stored in a modulated form. In such a scenario, the architecture of FIG. 5 is modified such that multiplexer 514 exists after channel encoder 516. Still, the invention is not limited in this regard.

According to another embodiment of the invention, the "known data preamble" may be injected at known intervals as a "known data amble" to aid in periodic resynchronization of the chaotic sequence generated in transmitter 100 and receiver 200. This would typically be the case for an implementation meant to operate in harsh channel conditions. Still, the invention is not limited in this regard.

Referring again to FIG. 5, multiplexer 514 is configured to select the symbol data to be routed to channel encoder 516 after a preamble period has expired. Multiplexer 514 is also configured to communicate the symbol data to channel encoder 516. In this regard, it should be appreciated that a communication of the symbol data to channel encoder 516 is delayed by a time defined by the length of the "known data preamble." As should be appreciated, this delay allows all of a "known data preamble" to be fully communicated to channel encoder 516 prior to communication of the symbol data.

Referring again to FIG. 5, channel encoder 516 is configured to perform actions for representing the "known data preamble" and the symbol data in the form of a channel encoded amplitude-and-time-discrete digital signal. The channel encoded amplitude-and-time-discrete digital signal is defined by digital words which represent intermediate frequency (IF) channel encoded symbols comprised of bits of data having a one (1) value or a zero (0) value. Methods for representing digital symbols by an amplitude-and-time-discrete digital signal are well known to persons having ordinary skill in the art. Thus, such methods will not be described in detail herein. However, it should be appreciated that channel encoder 516 can employ any such method. For example, channel encoder 516 can be selected as a digital baseband modulator employing quadrature phase shift keying (QPSK). As will be appreciated by those having ordinary skill in the art, the output of the QPSK channel encoder will include an in-phase ("I") data and quadrature phase ("Q") data. The I and Q data will be thereafter communicated to digital complex multiplier 524.

According to an embodiment of the invention, transmitter 100 is further comprised of a sample rate matching device (not shown) between channel encoder 516 and the digital complex multiplier 524. The sample rate matching device (not shown) is provided for resampling the amplitude-and-time-discrete digital signal at a sampling rate compatible with the chaos sampling rate. As should be appreciated, the sample rate matching device (not shown) modifies the amplitude-and-time-discrete digital signal so that a sample rate of the amplitude-and-time-discrete digital signal is consistent with a digital chaotic sequence communicated to complex multiplier 524. Still, the invention is not limited in this regard.

Referring again to FIG. 5, complex multiplier 524 performs a complex multiplication in the digital domain. In complex multiplier 524, the amplitude-and-time-discrete digital signal from channel encoder 516 is multiplied by a digital representation of a chaotic sequence. The chaotic sequence is generated in chaos generator 518. The rate at which the digital chaotic sequence is generated is an integer multiple of a data symbol rate. The greater the ratio between the data symbol period and the sample period of the digital chaotic sequence, the higher a spreading gain. Chaos generator 518 communicates the chaotic sequence to RUQG 520. RUQG 520 is configured to statistically transform a digital chaotic sequence into a transformed digital chaotic sequence with pre-determined statistical properties. The transformed digital chaotic sequence can have a characteristic form including combinations of real, complex, or quadrature, being of different word widths, and having different statistical distributions. For example, RUQG 520 may take in two (2) uniformly distributed real inputs from chaos generator 518 and convert those via a complex-valued bivariate Box-Muller transformation to a quadrature output having statistical characteristics of a Guassian distribution. Such conversions are well understood by those having ordinary skill in the art, and therefore will not be described herein. However, it should be understood that such techniques may use nonlinear processors, look-up tables, iterative processing (CORDIC functions), or other similar mathematical processes. RUQG 520 is further configured to communicate transformed chaotic sequences to SRCF 522.

The statistically transformed output of the digital chaotic sequence has a multi-bit resolution consistent with a resolution of DAC 532. RUQG 520 communicates the statistically transformed output of the digital chaotic sequence to SRCF 522. For example, RUQG 520 communicates an in-phase ("I") data and quadrature phase ("Q") data to SRCF 522 when channel encoder 516 is configured to yield a complex output representation. Still, the invention is not limited in this regard.

If a chaos sample rate of the transformed chaotic sequence is different than a sample rate required by subsequent signal processing, then the two rates must be matched. The chaotic sequence can therefore be resampled in SRCF 522. For example, SRCF 522 can be comprised of a real interpolation filters to upsample each of the in-phase and quadrature-phase processing paths of the chaotic sequence. As should be appreciated, SRCF 522 performs a sample rate change on the transformed digital chaotic sequence so that a sample rate of the transformed digital chaotic sequence is the same as the sampling rates required by subsequent signal processing operations. SRCF 522 is also configured to communicate a resampled, transformed digital chaotic sequence to digital complex multiplier 524.

According to an embodiment of the invention, RUQG 520 statistically transforms a digital chaotic sequence into a quadrature Gaussian form of the digital chaotic sequence. This statistical transformation is achieved via a nonlinear processor that combines lookup tables and embedded computational logic to implement the conversion of two (2) independent uniformly distributed random variables into a quadrature pair of Gaussian distributed variables. One such structure for this conversion is as shown in the mathematical expressions (1) and (2).

$$G_1 = \sqrt{-2\log(u_1)} \cdot \cos(2\pi u_2) \quad (1)$$

$$G_2 = \sqrt{-2\log(u_1)} \cdot \sin(2\pi u_2) \quad (2)$$

where $\{u_1, u_2\}$ are uniformly distributed independent input random variables and $\{G_1, G_2\}$ are Gaussian distributed output random variables. In such a scenario, SRCF 522 is comprised of one sample rate change filter to resample an in-phase ("I") data sequence and a second sample rate change filter to resample a quadrature-phase ("Q") data sequence. SRCF 522 is configured to communicate a resampled, transformed digital chaotic sequence to digital complex multiplier 524. More particularly, SRCF 522 communicates an in-phase ("I") data and quadrature phase ("Q") data to digital complex multiplier 524. Still, the invention is not limited in this regard.

According to another embodiment of the invention, the amplitude-and-time-discrete digital signal and the digital chaotic sequence are generated as zero intermediate frequency (IF) signals. Also, pulse shaping is not employed. Still, the invention is not limited in this regard.

Digital complex multiplier 524 performs a complex multiplication on the digital chaotic sequence output from SRCF 522 and the amplitude-and-time-discrete digital signal output from channel encoder 516. The resulting output is a digital representation of a coherent chaotic sequence spread spectrum modulated IF signal in which the digital data from channel encoder 516 has been spread over a wide frequency bandwidth in accordance with a chaotic sequence generated by chaos generator 518.

Digital complex multiplier 524 is configured to combine a digital chaotic sequence with an amplitude-and-time-discrete digital signal using an arithmetic operation. The arithmetic operation is selected as a complex-valued digital multiplication operation. The complex-valued digital multiplication operation includes multiplying the amplitude-and-time-discrete digital signal by the digital chaotic sequence to obtain a digital chaotic output signal. Digital complex multiplier 524 is also configured to communicate digital chaotic output signals to interpolator 526.

Interpolator 526, RPCM 528, and quadrature digital local oscillator 530 operate in tandem to form an intermediate frequency (IF) translator which frequency modulates a quadrature first intermediate frequency (IF) signal received from the complex multiplier to a second real intermediate frequency (IF) signal. Such digital intermediate frequency (IF) translators are known to those having ordinary skill in the art and shall not be discussed herein.

Interpolator 526 accepts an input from complex multiplier 524. In a preferred embodiment the modulated symbols are in quadrature form and the interpolator is implemented as two real interpolators. Still, the invention is not limited in this regard.

Interpolator 526 raises the sample rate of the amplitude-and-time-discrete digital signal received from complex multiplier 524 to a rate compatible with the bandwidth and center frequency of the second IF. Digital local oscillator 530 generates a complex quadrature amplitude-and-time-discrete digital sinusoid at a frequency which shall translate the first intermediate frequency (IF) to a desired second intermediate frequency (IF). Digital local oscillator 530 is also configured to pass its output to RPCM 528.

RPCM 528 is configured to accept as its inputs the quadrature output of interpolator 526 and the quadrature output of digital local oscillator 530. The real part of a complex multiplication is passed so that RPCM 528 implements only the real output portion of a complex multiplication. RPCM 528 is configured to pass its output to DAC 532. Still, the invention is not limited in this regard.

According to an embodiment of the invention, the digital chaotic sequence and the amplitude-and-time-discrete digital signal are zero intermediate frequency (IF) signals. The digital chaotic sequence is used to amplitude modulate the "known data preamble" and the data symbols via an efficient instantiation of a complex multiplier. The result of this amplitude modulation process is a zero IF signal. Still, the invention is not limited in this regard.

Referring again to FIG. 5, IF translator (and specifically RPCM 528) is configured to communicate a sampled digital chaotic output signal (i.e., a digital chaotic output signal having an increased sampling rate and a non-zero intermediate frequency) to DAC 532. Interpolator 526, digital local oscillator 530, RPCM 528, and DAC 532 collectively form an interpolating DAC that increases the effective sample rate. According to an embodiment of the invention, interpolator 526, digital local oscillator 530, RPCM 528, and DAC 532 interpolate the received zero IF signal to a two hundred eighty (280) mega sample per second sample rate. Interpolator 526, digital local oscillator 530, RPCM 528, and DAC 532 also up convert a real output component by a factor of the interpolated sample frequency (two hundred eighty (280) mega sample per second) divided four (4) before conversion to an analog signal. The output of DAC 532 is thus a real signal centered at a seventy (70) mega Hertz intermediate frequency with a first image centered at two hundred ten (210) mega hertz. Still, the invention is not limited in this regard.

DAC 532 is configured to communicate analog signals to dithering circuit 50 (described above in relation to FIG. 1). Dithering circuit 50 is configured to receive a clock signal from chaos sample clock 540. Dithering circuit 50 is also configured to receive a chip timing acquisition signal 3 from chip timing acquisition generator 544. Dithering circuit 50 is further configured to generate an analog discrete-value dither waveform and to communicate the analog discrete-value dither waveform to anti-image filter 534.

In some applications, it can be desirable to change a sampling rate at the output of complex multiplier 524 only (for example when using an integrated interpolating DAC). No IF translator need be provided for this purpose.

Referring again to FIG. 5, anti-image filter 534 is configured to remove spectral images from the analog signal to form a smooth time domain signal. Anti-image filter 534 is also configured to communicate a smooth time domain signal to RF translator 536. RF translator 536 is a wide bandwidth analog IF to RF up converter. RF translator 536 is configured to center a smooth time domain signal at an RF for transmission thereby forming an RF signal. RF translator 536 is also configured to communicate the RF signal to the power amplifier (not shown). The power amplifier (not shown) is configured to amplify a received RF signal. The power amplifier (not shown) is configured to communicate the amplified RF signal to antenna element 538 for communication to receiver 200 (described above in relation to FIGS. 1, 4 and described in further detail below in relation to FIG. 6).

It should be understood that the digital generation of the digital chaotic sequence at transmitter 100 and receiver 200 is kept closely coordinated under the control of a precision real time reference 512 clock. The higher the precision of the clock 512, the closer the synchronization of the chaos generator 518 of transmitter 100 and chaos generator (described below in relation to FIG. 6) of receiver 200 shall be excluding the effects of processing delay differences and channel propagation times. The use of a precision real time reference allows the states of the chaos generators to be easily controlled with precision.

Referring again to FIG. 5, precision real time reference 512 is a stable local oscillator locked to a precision real time reference, such as a GPS clock receiver or a chip scale atomic clock (CSAC). Precision real time reference 512 is configured to supply a high frequency clock to the clocked logic circuits 506 through 532 while being locked to a lower frequency reference clock. The lower frequency reference clock supplies a common reference and a common real time of day reference to prevent a large drift between the states of chaos generator 518 and the chaos generator (described below in relation to FIG. 6) of receiver 200 over an extended time interval.

A person skilled in the art will appreciate that transmitter 100 is one architecture of a communications system transmitter. However, the invention is not limited in this regard and any other transmitter architecture can be used without limitation. For example, transmitter 100 can include real first to second intermediate frequency (IF) translation instead of a quadrature first to second intermediate frequency (IF) translation. As another example, other architectures may employ additional chaotic sequence generators to provide a switched chaotic output or to control other aspects of transmitter 100.

Figure 6:
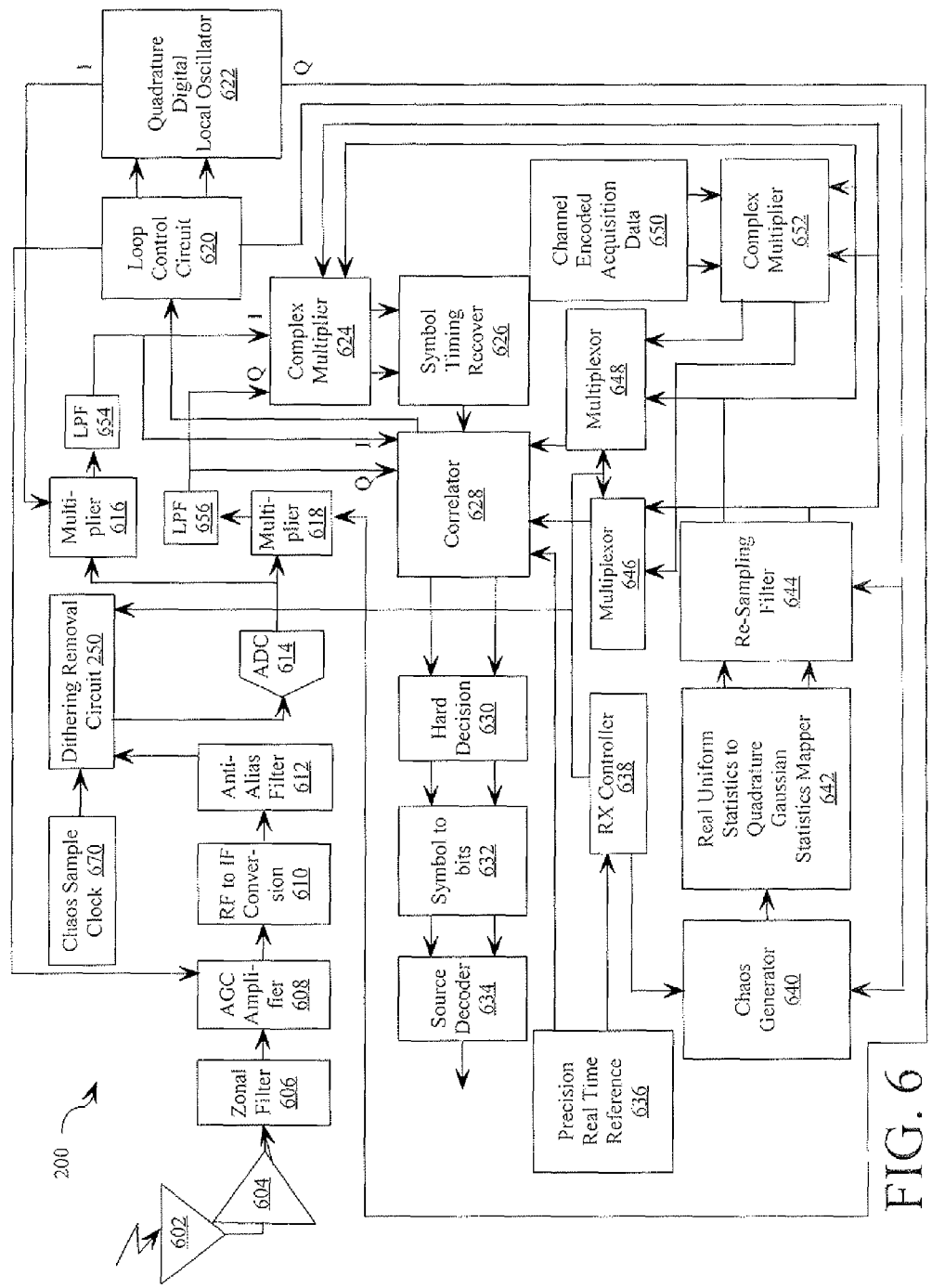
FIG. 6 is a more detailed block diagram of the receiver of FIG. 1 and FIG. 4A.

Referring now to FIG. 6, there is provided a more detailed block diagram of receiver 200 of FIGS. 1 and 4 that is useful for understanding the invention. It should be noted that in conventional analog based coherent communications systems analog chaos circuits are synchronized by periodically exchanging state information. The exchange of state information requires a substantial amount of additional bandwidth. The exchange of state information is what makes analog based coherent communications impracticable. Receiver 200 of FIG. 6 is designed to eliminate the drawbacks of conventional analog based coherent communications systems. In this regard it should be appreciated that receiver 200 is comprised of a digital chaos generator. Receiver 200 includes a tracking loop for synchronizing its digital chaos generator and digital chaos generator 518 of transmitter 100. Most significantly, receiver 200 is configured to synchronize two (2) strings of discrete time chaotic samples (i.e., chaotic sequences) without using a constant or periodic transfer of state update information. A first string of discrete time chaotic samples is generated at transmitter 100. A second string of discrete time chaotic samples is generated at receiver 200.

Referring again to FIG. 6, receiver 200 is comprised of an antenna element 602, a low noise amplifier (LNA) 604, a zonal filter 606, an AGC amplifier 608, a radio frequency (RF) to intermediate frequency (IF) conversion device 610, an anti-alias filter 612, a dithering removal circuit 250, a chaos sample clock 670, an amble present signal generator (APSG) portion of the receiver (RX) controller 638, and an analog-to-digital (A/D) converter 614. Receiver 200 is also comprised of real multipliers 616, 618, real lowpass filters 654, 656, a loop control circuit 620, a quadrature digital local oscillator (QDLO) 622, a correlator 628, multiplexers 646, 648, a channel encoded acquisition data generator (CEADG) 650, digital complex multipliers 624, 652, and a symbol timing recovery circuit 626. Receiver 200 is further comprised of a receiver controller 638, a precision real time reference clock 636, a hard decision device 630, a symbol to bits (S/B) converter 632, and a source decoder 634. Receiver 200 is comprised of a chaos generator 640, a real uniform statistic to quadrature Gaussian statistic mapper (RUQG) 642, and a re-sampling filter 644. Each of the above listed components and circuits 602-618, 622-626, 630-638, 642-656 are well known to persons having ordinary skill in the art. Thus, these components and circuits will not be described in detail herein. However, a brief discussion of the receiver 200 architecture is provided to assist a reader in understanding the present invention. It should be noted that receiver 200 is utilizing a novel architecture/algorithm when receiver 200 is in both acquisition and tracking modes (described below).

Referring again to FIG. 6, antenna element 602 is configured to receive an analog input signal communicated from transmitter 100 over a communications link. Antenna element 602 is also configured to communicate the analog input signal to LNA 604. LNA 604 is configured to amplify a received analog input signal while adding as little noise and distortion as possible. LNA 604 is also configured to communicate an amplified, analog input signal to zonal filer 606. Zonal filters are analog filters with slow roll off characteristic but low injection loss used to suppress large interfering signals outside of bands of interest. Zonal filters are well known to persons having ordinary skill in the art, and therefore will not be described in detail herein. It should be appreciated that zonal filter 606 is configured to communicate a filtered, analog input signal to the automatic gain control (AGC) amplifier 608. AGC amplifier 608 is a controllable gain amplifier used to keep the magnitude of the received signal within normal bounds for the rest of the signal processing chain. AGC amplifiers are well known to persons having ordinary skill in the art, and therefore will not be described herein. However, it should be appreciated that AGC amplifier 608 is configured to communicate a gain adjusted, analog input signal to the RF to IF conversion device 610.

RF to IF conversion device 610 is configured to mix the analog input signal to a preferred IF for conversion to a digital signal at A/D converter 614. RF to IF conversion device 610 is also configured to communicate a mixed analog input signal to anti-alias filter 612. Anti-alias filter 612 is configured to restrict a bandwidth of a mixed analog input signal. Anti-alias filter 612 is also configured to communicate a filtered, analog input signal to dithering removal circuit 250 (described above in relation to FIG. 4A). Dithering removal circuit 250 (described above in relation to FIG. 4A) is configured for receiving a clock signal from chaos sample clock 670 and an amble present signal from chip timing indicator signal from the Rx controller 638. Dithering removal circuit 250 (described above in relation to FIG. 4A) is also configured for generating a sampled analog output signal. Dithering removal circuit 250 (described above in relation to FIG. 4A) is further configured for communicating the sampled analog output signal to A/D converter 614.

A/D converter 614 is configured to convert a received analog input signal to a digital signal. A/D converter 614 is also configured to communicate a digital input signal to a second IF translator. The second IF translator is comprised of real multipliers 616, 618, and lowpass filters (LPFs) 654, 656, and QDLO 622. The QDLO 622, real multipliers 616, 618, and LPFs 654, 656 combine to form a digital Weaver modulator which forms a baseband quadrature signal from the real IF signal generated by the RF front end 602-610.

Multiplier 616 is configured to receive a digital word as input from A/D converter 614 and a digital word from the in-phase component of QDLO 622. Multiplier 616 multiplies the output of A/D converter 614 by the in-phase component of QDLO 622. Multiplier 616 is also configured to communicate a digital output word. Multiplier 618 is configured to receive a digital word as input from A/D converter 614 and a digital word from the quadrature-phase component of QDLO 622. Multiplier 618 multiplies the output of A/D converter 614 by the quadrature-phase component of QDLO 622. Multiplier 618 is also configured to communicate a digital output word.

QDLO 622 generates a complex quadrature amplitude-and-time-discrete digital sinusoid at a frequency which shall translate the first IF to baseband and remove detected frequency and phase offsets in the resulting quadrature baseband signal. QDLO 622 accepts as its inputs a binary phase control word and a binary frequency control word from loop control circuit 620. Quadrature digital local oscillators are known to those having ordinary skill in the art, and therefore will not be described in detail herein.

Lowpass filter 654 receives its input from multiplier 616. Lowpass filter 656 receives its input from multiplier 618. The two lowpass filters collectively reject the undesired sideband from the complex result of the multiplications to form an analytic signal. The outputs of lowpass filters 654, 656 form the output of the IF translator.

The IF translator is configured to mix the digital input signal to a preferred IF for processing at correlator 628 and complex multiplier 624. The IF translator is also configured to communicate a digital input signal to correlator 628 and complex multiplier 624. As will be appreciated by those having ordinary skill in the art, the output of the IF translator can include an in-phase ("I") data and quadrature phase ("Q") data. As such, the IF translator can communicate I and Q data to correlator 628 and complex multiplier 624.

Complex multiplier 624 is configured to perform a complex multiplication in the digital domain. In the complex multiplier 624, the digital input signal from the IF translator is multiplied by a digital representation of a chaotic sequence. The chaotic sequence is generated in chaos generator 640. Chaos generator 640 communicates the chaotic sequence to RUQG 642. In this regard, it should be appreciated that chaos generator 640 is coupled to receiver controller 638. Receiver controller 638 is configured to control chaos generator 640 so that chaos generator 640 generates a chaotic sequence with the correct initial state when receiver 200 is in an acquisition mode and a tracking mode.

RUQG 642 is configured to statistically transform a digital chaotic sequence into a transformed digital chaotic sequence. The transformed digital chaotic sequence can have a characteristic form including combinations of real, complex, or quadrature, being of different word widths, and having different statistical distributions. One such statistical transformation used in the preferred embodiment is a bivariate Gaussian distribution that converts two (2) independent uniformly distributed random variables to a pair of quadrature Gaussian distributed variables. RUQG 642 is further configured to communicate transformed chaotic sequences to re-sampling filter 644.

According to the embodiment of the invention, RUQG 642 statistically transforms a digital chaotic sequence into a quadrature Gaussian form of the digital chaotic sequence. RUQG 642 communicates the quadrature Gaussian form of the digital chaotic sequence to re-sampling filter 644. More particularly, RUQG 642 communicates an in-phase ("I") data and quadrature phase ("Q") data to re-sampling filter 644. Still, the invention is not limited in this regard.

Re-sampling filter 644 is also configured to forward a transformed chaotic sequence to digital complex multiplier 624. Re-sampling filter 644 is configured as a sample rate change filter for making the chaos sample rate compatible with the received signal sample rate when receiver 200 is in acquisition mode. Re-sampling filter 644 is also configured to compensate for transmit and receive clock offsets with less than a certain level of distortion when receiver 200 is in a steady state demodulation mode. In this regard, it should be appreciated that re-sampling filter 644 is configured to convert a sampling rate of in-phase ("I") and quadrature-phase ("Q") data sequences from a first sampling rate to a second sampling rate without changing the spectrum of the data contained in therein. Re-sampling filter 644 is further configured to communicate in-phase ("I") and quadrature-phase ("Q") data sequences to complex multipliers 624, 652 and multiplexers 646, 648.

It should be noted that if a sampled form of a chaotic sequence is thought of as discrete samples of a continuous band limited chaos then re-sampling filter 644 is effectively tracking the discrete time samples, computing a continuous representation of the chaotic sequence, and resampling the chaotic sequence at the discrete time points required to match the discrete time points sampled by A/D converter 614. In effect, input values and output values of re-sampling filter 644 are not exactly the same because the values are samples of the same waveform taken at slightly offset times. However, the values are samples of the same waveform so the values have the same power spectral density.

Referring again to FIG. 6, CEADG 650 is configured to generate a modulated acquisition sequence. CEADG 650 is also configured to communicate a modulated acquisition sequence to complex multiplier 652. Complex multiplier 652 is configured to perform a complex multiplication in the digital domain. This complex multiplication includes multiplying a modulated acquisition sequence from CEADG 650 by a digital representation of a chaotic sequence to yield a reference for a digital input signal. Complex multiplier 652 is also configured to communicate reference signal to multiplexers 646, 648. Multiplexer 646 is configured to route the quadrature-phase part of a reference signal to correlator 628. Multiplexer 648 is configured to route the in-phase part of a reference signal to correlator 628. In this regard, it should be appreciated that multiplexers 646, 648 are coupled to receiver controller 638. Receiver controller 638 is configured to control multiplexers 646, 648 in tandem so that the multiplexers 646, 648 route the reference signal to correlator 628 while the receiver 200 is in an acquisition mode (described below).

Correlator 628 is configured to correlate a chaotic sequence with a digital input signal. In this regard, it should be understood that, the sense of the real and imaginary components of the correlation is directly related to the values of the real and imaginary components of the symbols of a digital input signal. It should also be understood that, in a preferred embodiment, the sense of the real and imaginary components of the correlation is directly related to the values of the real and imaginary components of the PSK symbols of a digital input signal. Thus, when correlator 628 is in a steady state demodulation mode the output of correlator 628 is PSK symbol soft decisions. In this regard, it should be appreciated that soft information refers to soft-values (which are represented by soft-decision bits) that comprise information about the bits contained in a sequence. In particular, soft-values are values that represent the probability that a particular bit in a sequence is either a one (1) or a zero (0). For example, a soft-value for a particular bit can indicate that a probability of a bit being a one (1) is p(1)=0.3. Conversely, the same bit can have a probability of being a zero (0) which is p(0)=0.7.

Correlator 628 is also configured to communicate PSK soft decisions to hard decision device 630 for final symbol decision making Hard decision device 630 is configured to communicate symbol decisions to S/B converter 632. S/B converter 632 is configured to convert symbols to a binary form. S/B converter 632 is also configured to communicate a binary data sequence to source decoder 634. Source decoder 634 is configured to decode FEC applied at the transmitter and to pass the decoded bit stream to one or more external devices (not shown) utilizing the decoded data.

Correlator 628 is also configured to acquire initial timing information associated with a chaotic sequence, initial timing associated with a data sequence and to track phase and frequency offset information between the chaotic sequence and a digital input signal. Correlator 628 is also configured to track input signal magnitude information between the chaotic sequence and a digital input signal. Acquisition of initial timing information and tracking of input signal magnitude, phase and frequency offset information are standard functions in digital communication systems. As such, methods for acquiring initial timing information and tracking phase and frequency offset information are well known to persons skilled in the art, and therefore will not be described in detail herein. However, it should be appreciated that any such method can be used without limitation.

Referring again to FIG. 6, correlator 628 is configured to communicate the magnitude and phase information as a function of time to loop control circuit 620. Loop control circuit 620 uses the magnitude and phase information to calculate the deviation of the input signal magnitude from a nominal range, and phase and frequency offset information to synchronize a chaotic sequence with a digital input signal. Loop control circuit 620 is also configured to communicate the phase and frequency offset information to QDLO 622 portion of the IF translator and gain deviation compensation information to AGC amplifier 608. Loop control circuit 620 is further configured to communicate a retiming control signal to re-sampling filter 644 and chaos generator 640.

It should be understood that the digital generation of the digital chaotic sequence at transmitter 100 and receiver 200 is kept closely coordinated under the control of a precision real time reference clock 636. The higher the precision of the clock 636, the closer the synchronization of chaos generator 518 of transmitter 100 and chaos generator 640 of receiver 200 shall be excluding the effects of processing delay differences and channel propagation times. It is the use of digital chaos generators 518, 640 that allow the states of the chaos generators to be easily controlled with precision, thus allowing coherent communication.

Referring again to FIG. 6, the precision real time reference clock 636 is a stable local oscillator locked to a precision real time reference, such as a GPS clock receiver or a chip scale atomic clock (CSAC). The precision real time reference clock 636 is configured to supply a high frequency clock to the clocked logic circuits 614, ..., 656 while being locked to a lower frequency reference clock. The lower frequency reference clock supplies a common reference and a common real time of day reference to prevent a large drift between the states of chaos generator 518 and chaos generator 640 of receiver 200 over an extended time interval.

The operation of receiver 200 will now be briefly described with regard to an acquisition mode and a steady state demodulation mode.

Acquisition Mode:

In acquisition mode, re-sampling filter 644 performs a rational rate change and forwards a transformed chaotic sequence to digital complex multiplier 652. CEADG 650 generates a modulated acquisition sequence and forwards the same to complex multiplier 652. Complex multiplier 652 performs a complex multiplication in the digital domain. In complex multiplier 652, a modulated acquisition sequence from CEADG 650 is multiplied by a digital representation of a chaotic sequence to yield a reference for a digital input signal that was generated at transmitter 100 to facilitate initial acquisition. The chaotic sequence is generated in chaos generator 640. Complex multiplier 652 communicates a reference signal to multiplexers 646, 648. Multiplexers 646, 648 route the reference signal to correlator 628. Correlator 628 is transitioned into a search mode. In this search mode, correlator 628 searches across an uncertainty window to locate a received signal state so that chaos generator 640 can be set with the time synchronized state vector.

Steady State Demodulation Mode:

In steady state demodulation mode, correlator 628 tracks the correlation between the received modulated signal and the locally generated chaos close to the nominal correlation peak to generate magnitude and phase information as a function of time. This information is passed to loop control circuit 620. Loop control circuit 620 applies appropriate algorithmic processing to this information to extract timing offset, phase offset, frequency offset, and magnitude compensation information. Correlator 628 also passes its output information, based on correlation times terminated by symbol boundaries, to the hard decision block 630. Hard decision block 630 compares the correlation information to pre-determined thresholds to make hard symbol decisions. Loop control circuit 620 monitors the output of correlator 628. When loop control circuit 620 detects fixed correlation phase offsets, the phase control of QDLO 622 is modified to remove the phase offset. When loop control circuit 620 detects phase offsets that change as a function of time, it adjusts re-sampling filter 644 which acts as an incommensurate re-sampler when receiver 200 is in steady state demodulation mode or the frequency control of QDLO 622 is modified to remove frequency or timing offsets. When the correlator's 628 output indicates that the received digital input signal timing has "drifted" more than plus or minus a half (½) of a sample time relative to a locally generated chaotic sequence: loop control circuit 620: (1) adjusts a correlation window in an appropriate temporal direction by one sample time; (2) advances or retards a state of the local chaos generator 640 by one iteration state; and (3) adjusts re-sampling filter 644 to compensate for the time discontinuity. This loop control circuit 620 process keeps chaos generator 518 of transmitter 100 and chaos generator 640 of receiver 200 synchronized to within half (½) of a sample time.

More precise temporal synchronization is achieved by resampling filter 644 which can be implemented as a member of the class of polyphase fractional time delay filters. This class of filters is well known to persons having ordinary skill in the art, and therefore will not be described herein.

As described above, a number of chaotic samples are combined with an information symbol at transmitter 100. Since transmitter 100 and receiver 200 timing are referenced to two (2) different precision real time reference clock 512, 636 oscillators, symbol timing must be recovered at the receiver 200 to facilitate robust demodulation. Symbol timing recovery can include: (1) multiplying a received input signal by a complex conjugate of a locally generated chaotic sequence using the complex multiplier 624; (2) computing an N point running average of the product where N is a number of chaotic samples per symbol time; (3) storing the values, the maximum absolute values of the running averages, and the time of occurrence; and (4) statistically combining the values at the symbol timing recovery circuit 626 to recover symbol timing. It should be noted that symbol timing recover can also be accomplished via an output of correlator 628. However, additional correlator operations are needed in such a scenario. As should be appreciated, using a separate multiplier operation for this purpose adds additional capabilities to the receiver 200, such as the capability to correlate and post process over multiple correlation windows simultaneously to locate the best statistical fit for symbol timing.

In this steady state demodulation mode, symbol timing recovery circuit 626 communicates a symbol onset timing to correlator 628 for controlling an initiation of a symbol correlation. Correlator 628 correlates a locally generated chaotic sequence with a received digital input signal during a symbol duration. In this regard, it should be understood that the sense and magnitude of a real and imaginary components of the correlation is directly related to the values of the real and imaginary components of symbols of a digital input signal. Accordingly, correlator 628 generates symbol soft decisions. Correlator 628 communicates the symbol soft decisions to hard decision device 630 for final symbol decision making Hard decision device 630 determines symbols using the symbol soft decisions. Thereafter, hard decision device 630 communicates the symbols to S/B converter 632. S/B converter 632 converts the symbol decisions to a binary form. S/B converter 632 is configured to communicate a binary data sequence to source decoder 634. Source decoder 634 is configured to decide FEC applied at transmitter 100 and pass the decoded bit stream to one or more external devices (not shown) utilizing the decoded data.

A person skilled in the art will appreciate that the receiver 200 is one architecture of a communications system receiver. However, the invention is not limited in this regard and any other receiver architecture can be used without limitation.

Chaos Generators and Digital Chaotic Sequence Generation

Figure 7:
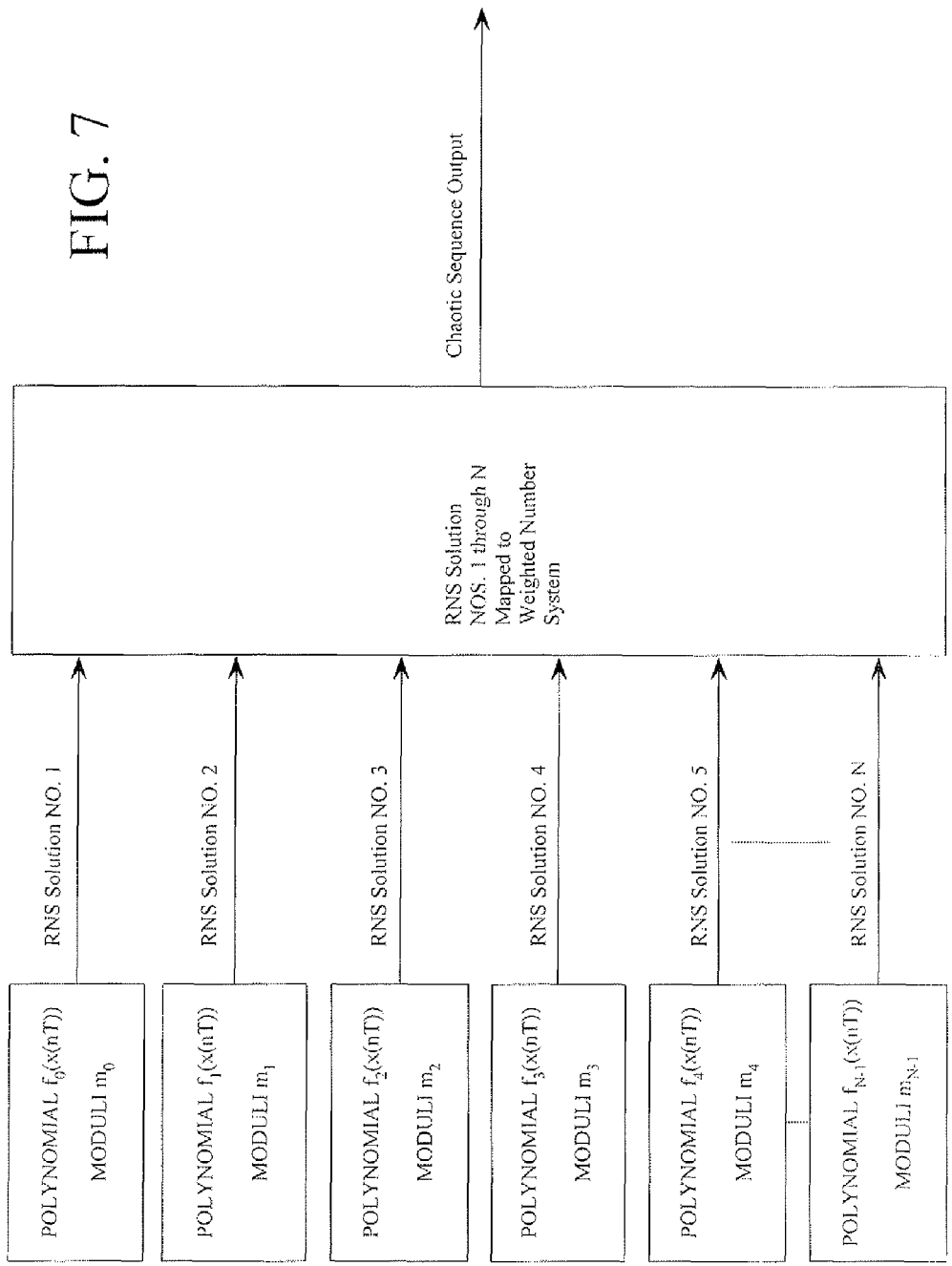
FIG. 7 is a conceptual diagram of the chaos generators of FIG. 2 and FIGS. 4-6.

Referring now to FIG. 7, there is provided a conceptual diagram of a chaos generator 2, 102, 518, 640 (described above in relation to FIG. 2 and FIGS. 4A, 5-6, respectively) that is useful for understanding the invention. As shown in FIG. 7, generation of the chaotic sequence begins with N polynomial equations $f_0(x(nT)), \ldots, f_{N-1}(x(nT))$. The polynomial equations $f_0(x(nT)), \ldots, f_{N-1}(x(nT))$ can be selected as the same polynomial equation or as different polynomial equations. According to an aspect of the invention, the polynomial equations $f_0(x(nT)), \ldots, f_{N-1}(x(nT))$ are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation", as used herein, refers to a polynomial equation that cannot be expressed as a product of at least two nontrivial polynomial equations over the same Galois field (GF). For example, the polynomial equation f(x(nT)) is irreducible if there does not exist two (2) non-constant polynomial equations g(x(nT)) and h(x(nT)) in x(nT) with rational coefficients such that f(x(nT))=g(x(nT))·h(x(nT)).

As will be understood by a person having ordinary skill in the art, each of the polynomial equations $f_0(x(nT))$, . . . , $f_{N-1}(x(nT))$ can be solved independently to obtain a respective solution. Each solution can be expressed as a residue number system (RNS) residue value using RNS arithmetic operations, i.e. modulo operations. Modulo operations are well known to persons having ordinary skill in the art. Thus, such operations will not be described in detail herein. However, it should be appreciated that a RNS residue representation for some weighted value "a" can be defined by mathematical equation (3).

$$R=\{a \text{ modulo } m_0, a \text{ modulo } m_1, \ldots, a \text{ modulo } m_{N-1}\} \quad (3)$$

where R is a RNS residue N-tuple value representing a weighted value "a". Further, R(nT) can be a representation of the RNS solution of a polynomial equation f(x(nT)) defined as R(nT)={$f_0(x(nT))$ modulo $m_0$, $f_1(x(nT))$ modulo $m_1$, . . . , $f_{N-1}(x(nT))$ modulo $m_{N-1}$}. $m_0, m_1, \ldots, m_{N-1}$ respectively are the moduli for RNS arithmetic operations applicable to each polynomial equation $f_0(x(nT))$, . . . , $f_{N-1}(x(nT))$.

From the foregoing, it will be appreciated that the RNS employed for solving each of the polynomial equations $f_0(x(nT))$, . . . , $f_{N-1}(x(nT))$ respectively has a selected modulus value $m_0, m_1, \ldots, m_{N-1}$. The modulus value chosen for each RNS moduli is preferably selected to be relatively prime numbers $p_0, p_1, \ldots, p_{N-1}$. The phrase "relatively prime numbers" as used herein refers to a collection of natural numbers having no common divisors except one (1). Consequently, each RNS arithmetic operation employed for expressing a solution as a RNS residue value uses a different prime number $p_0, p_1, \ldots, p_{N-1}$ as a moduli $m_0, m_1, \ldots, m_{N-1}$.

Those skilled in the art will appreciate that the RNS residue value calculated as a solution to each one of the polynomial equations $f_0(x(nT))$, . . . , $f_{N-1}(x(nT))$ will vary depending on the choice of prime numbers $p_0, p_1, \ldots, p_{N-1}$ selected as a moduli $m_0, m_1, \ldots, m_{N-1}$. Moreover, the range of values will depend on the choice of relatively prime numbers $p_0, p_1, \ldots, p_{N-1}$ selected as a moduli $m_0, m_1, \ldots, m_{N-1}$. For example, if the prime number five hundred three (503) is selected as modulus $m_0$, then an RNS solution for a first polynomial equation $f_0(x(nT))$ will have an integer value between zero (0) and five hundred two (502). Similarly, if the prime number four hundred ninety-one (491) is selected as modulus $m_1$, then the RNS solution for a second polynomial equation $f_1(x(nT))$ has an integer value between zero (0) and four hundred ninety (490).

According to an embodiment of the invention, each of the N polynomial equations $f_0(x(nT))$, . . . , $f_{N-1}(x(nT))$ is selected as an irreducible cubic polynomial equation having chaotic properties in Galois field arithmetic. Each of the N polynomial equations $f_0(x(nT))$, . . . , $f_{N-1}(x(nT))$ can also be selected to be a constant or varying function of time. The irreducible cubic polynomial equation is defined by a mathematical equation (4).

$$f(x(nT))=Q(k)x^3(nT)+R(k)x^2(nT)+S(k)x(nT)+C(k,L) \quad (4)$$

where n is a sample time index value. k is a polynomial time index value. L is a constant component time index value. T is a fixed constant having a value representing a time interval or increment. Q, R, and S are coefficients that define the polynomial equation f(x(nT)). C is a coefficient of x(nT) raised to a zero power and is therefore a constant for each polynomial characteristic. In a preferred embodiment, a value of C is selected which empirically is determined to produce an irreducible form of the stated polynomial equation f(x(nT)) for a particular prime modulus. For a given polynomial with fixed values for Q, R, and S more than one value of C can exist, each providing a unique iterative sequence. Still, the invention is not limited in this regard.

According to another embodiment of the invention, the polynomial equations $f_0(x(nT))$ . . . $f_{N-1}(x(nT))$ are identical exclusive of a constant value C. For example, a first polynomial equation $f_0(x(nT))$ is selected as $f_0(x(nT))=3x^3(nT)+3x^2(nT)+x(nT)+C_0$. A second polynomial equation $f_1(x(nT))$ is selected as $f_1(x(nT))=3x^3(nT)+3x^2(nT)+x(nT)+C_1$. A third polynomial equation $f_2(x(nT))$ is selected as $f_2(x(nT))=3x^3(nT)+3x^2(nT)+x(nT)+C_2$, and so on. Each of the constant values $C_0, C_1, \ldots, C_{N-1}$ is selected to produce an irreducible form in a residue ring of the stated polynomial equation $f(x(nT))=3x^3(nT)+3x^2(nT)+x(nT)+C$. In this regard, it should be appreciated that each of the constant values $C_0, C_1, \ldots, C_{N-1}$ is associated with a particular modulus $m_0, m_1, \ldots, m_{N-1}$ value to be used for RNS arithmetic operations when solving the polynomial equation f(x(nT)). Such constant values $C_0, C_1, \ldots, C_{N-1}$ and associated modulus $m_0, m_1, \ldots, m_{N-1}$ values which produce an irreducible form of the stated polynomial equation f(x(nT)) are listed in the following Table (1).

TABLE 1

| Moduli values $m_0, m_1, \ldots, m_{N-1}$: | Sets of constant values $C_0, C_1, \ldots, C_{N-1}$: |
| --- | --- |
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 7 will depend on the quantity of polynomial equations N and the modulus values $m_0, m_1, \ldots, m_{N-1}$ selected for the RNS number systems. In particular, this value can be calculated as the product $M = m_0 \cdot m_1, \cdot m_3 \cdot m_4 \cdot \ldots \cdot m_{N-1}$.

Referring again to FIG. 7, it should be appreciated that each of the RNS solutions Nos. 1 through N is expressed in a binary number system representation. As such, each of the RNS solutions Nos. 1 through N is a binary sequence of bits. Each bit of the sequence has a zero (0) value or a one (1) value. Each binary sequence has a bit length selected in accordance with a particular moduli.

According to an embodiment of the invention, each binary sequence representing a residue value has a bit length (BL) defined by a mathematical equation (5).

$$BL = \text{Ceiling}[\text{Log } 2(m)] \quad (5)$$

where m is selected as one of moduli $m_0, m_1, \ldots, m_{N-1}$. Ceiling[u] refers to a next highest whole integer with respect to an argument u.

In order to better understand the foregoing concepts, an example is useful. In this example, six (6) relatively prime moduli are used to solve six (6) irreducible polynomial equations $f_0(x(nT)), \ldots, f_5(x(nT))$. A prime number $p_0$ associated with a first modulus $m_0$ is selected as five hundred three (503). A prime number $p_1$ associated with a second modulus $m_1$ is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0(x(nT))$ are in the range of zero (0) and five hundred two (502) which can be represented in nine (9) binary digits. Possible solutions for $f_0(x(nT))$ are in the range of zero (0) and four hundred ninety (490) which can be represented in nine (9) binary digits. Possible solutions for $f_0(x(nT))$ are in the range of zero (0) and four hundred seventy eight (478) which can be represented in nine (9) binary digits. Possible solutions for $f_0(x(nT))$ are in the range of zero (0) and four hundred sixty six (466) which can be represented in nine (9) binary digits. Possible solutions for $f_0(x(nT))$ are in the range of zero (0) and two hundred fifty six (256) which can be represented in nine (9) binary digits. Possible solutions for $f_5(x(nT))$ are in the range of zero (0) and two hundred fifty (250) which can be represented in eight (8) binary digits. Arithmetic for calculating the recursive solutions for polynomial equations $f_0(x(nT)), \ldots, f_4(x(nT))$ requires nine (9) bit modulo arithmetic operations. The arithmetic for calculating the recursive solutions for polynomial equation $f_5(x(nT))$ requires eight (8) bit modulo arithmetic operations. In aggregate, the recursive results $f_0(x(nT)), \ldots, f_5(x(nT))$ represent values in the range from zero (0) to M−1. The value of M is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling[Log 2(3,563,762,191,059,523)] = Ceiling[51.66] = 52 bits. Because each polynomial is irreducible, all 3,563,762,191,059,523 possible values are computed resulting in a sequence repetition time of every M times T seconds, i.e, a sequence repetition times an interval of time between exact replication of a sequence of generated values. Still, the invention is not limited in this regard.

Referring again to FIG. 7, the RNS solutions Nos. 1 through N are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through N are mapped to a weighted number system representation by determining a series of digits in the weighted number system based on the RNS solutions Nos. 1 through N. The term "digit" as used herein refers to a symbol of a combination of symbols to represent a number. For example, a digit can be a particular bit of a binary sequence. According to another aspect of the invention, the RNS solutions Nos. 1 through N are mapped to a weighted number system representation by identifying a number in the weighted number system that is defined by the RNS solutions Nos. 1 through N. According to yet another aspect of the invention, the RNS solutions Nos. 1 through N are mapped to a weighted number system representation by identifying a truncated portion of a number in the weighted number system that is defined by the RNS solutions Nos. 1 through N. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through N to a weighted number system representation.

According to an embodiment of the invention, a mixed-radix conversion method is used for mapping RNS solutions Nos. 1 through N to a weighted number system representation. "The mixed-radix conversion procedure to be described here can be implemented in" [modulo moduli only and not modulo the product of moduli.] See *Residue Arithmetic and Its Applications To Computer Technology*, written by Nicholas S. Szabo & Richard I. Tanaka, McGraw-Hill Book Co., New York, 1967. To be consistent with said reference, the following discussion of mixed radix conversion utilizes one (1) based variable indexing instead of zero (0) based indexing used elsewhere herein. In a mixed-radix number system, "a number x may be expressed in a mixed-radix form:

$$x = a_N \prod_{i=1}^{N-1} R_i + \ldots + a_3 R_1 R_2 + a_2 R_1 + a_1$$

where the $R_i$ are the radices, the $a_i$ are the mixed-radix digits, and $0 \le a_i < R_i$. For a given set of radices, the mixed-radix representation of x is denoted by $(a_n, a_{n-1}, \ldots, a_1)$ where the digits are listed in order of decreasing significance." See Id. "The multipliers of the digits $a_i$ are the mixed-radix weights where the weight of $a_i$ is $$\prod_{j=1}^{i-1} R_j \text{ for } i \ne 1.\text{" See Id.}$$

For conversion from the RNS to a mixed-radix system, a set of moduli are chosen so that $m_i = R_i$. A set of moduli are also chosen so that a mixed-radix system and a RNS are said to be associated. "In this case, the associated systems have the same range of values, that is $$\prod_{i=1}^{N} m_i.$$

The mixed-radix conversion process described here may then be used to convert from the [RNS] to the mixed-radix system." See Id.

"If $m_i = R_i$, then the mixed-radix expression is of the form:

$$x = a_N \prod_{i=1}^{N-1} m_i + \ldots + a_3 m_1 m_2 + a_2 m_1 + a_1$$

where $a_i$ are the mixed-radix coefficients. The $a_i$ are determined sequentially in the following manner, starting with $a_1$." See Id.

$$x = a_N \prod_{i=1}^{N-1} m_i + \ldots + a_3 m_1 m_2 + a_2 m_1 + a_1$$

is first taken modulo $m_1$. "Since all terms except the last are multiples of $m_1$, we have $\langle x \rangle_{m_1} = a_1$. Hence, $a_1$ is just the first residue digit." See Id.

"To obtain $a_2$, one first forms $x-a_1$ in its residue code. The quantity $x-a_1$ is obviously divisible by $m_1$. Furthermore, $m_1$ is relatively prime to all other moduli, by definition. Hence, the division remainder zero procedure [Division where the dividend is known to be an integer multiple of the divisor and the divisor is known to be relatively prime to M] can be used to find the residue digits of order 2 through N of $$\frac{x - a_1}{m_1}.$$

Inspection of $$\left[ x = a_N \prod_{i=1}^{N-1} m_i + \ldots + a_3 m_1 m_2 + a_2 m_1 + a_1 \right]$$

shows then that x is $a_2$. In this way, by successive subtracting and dividing in residue notation, all of the mixed-radix digits may be obtained." See Id.

"It is interesting to note that $$a_1 = \langle x \rangle_{m_1}, \; a_2 = \left\langle \left\lfloor \frac{x}{m_1} \right\rfloor \right\rangle_{m_2}, \; a_3 = \left\langle \left\lfloor \frac{x}{m_1 m_2} \right\rfloor \right\rangle_{m_3}$$

and in general for $i > 1$ $$a_i = \left\langle \left\lfloor \frac{x}{m_1 m_2 \ldots m_{i-1}} \right\rfloor \right\rangle_{m_i}."$$

See Id. From the preceding description it is seen that the mixed-radix conversion process is iterative. The conversion can be modified to yield a truncated result. Still, the invention is not limited in this regard.

According to another embodiment of the invention, a Chinese remainder theorem (CRT) arithmetic operation is used to map the RNS solutions Nos. 1 through N to a weighted number system representation. The CRT arithmetic operation is well known in the art and therefore will not be described here in detail. The first known formulation of the Chinese Remainder Theorem is attributed to Sunzi in his "Book of Arithmetics" circa 500 A.D. However, a brief discussion of how the CRT is applied may be helpful for understanding the invention. The CRT arithmetic operation can be defined by a mathematical equation (6) [returning to zero (0) based indexing].

$$Y(nT) = \left\{ \begin{array}{l} [\langle (3x_0^3(nT) + 3x_0^2(nT) + x_0(nT) + C_0)b_0 \rangle_{p_0}] \frac{M}{p_0} + \ldots + \\ [\langle (3x_{N-1}^3(nT) + 3x_{N-1}^2(nT) + x_{N-1}(nT) + C_{N-1})b_{N-1} \rangle_{p_{N-1}}] \frac{M}{p_{N-1}} \end{array} \right\}_M \quad (6)$$

Mathematical Equation (6) can be re-written in iterative form as mathematical Equation (7).

$$Y(nT) = \qquad\qquad\qquad\qquad\qquad\qquad\qquad\qquad\qquad (7)$$

$$\left\{ \begin{array}{l} [\langle (3x_0^3(n-1)T) + 3x_0^2((n-1)T) + x_0((n-1)T) + C_0)b_0 \rangle_{p_0}] \frac{M}{p_0} + \ldots + \\ [\langle (3x_{N-1}^3((n-1)T) + 3x_{N-1}^2((n-1)T) + x_{N-1}((n-1)T) + C_{N-1})b_{N-1} \rangle_{p_{N-1}}] \frac{M}{p_{N-1}} \end{array} \right\}_M$$

where $Y(nT)$ is the result of the CRT arithmetic operation. n is a sample time index value. T is a fixed constant having a value representing a time interval or increment. $x_0$-$x_{N-1}$ are RNS solutions Nos. 1 through N. $p_0, p_1, \ldots, p_{N-1}$ are prime numbers. M is a fixed constant defined by a product of the relatively prime numbers $p_0, p_1, \ldots p_{N-1}$. $b_0, b_1, \ldots, b_{N-1}$ are fixed constants that are chosen as the multiplicative inverses of the product of all other primes modulo $p_0, p_1, \ldots, p_{N-1}$, respectively. Equivalently, $$b_j = \left( \frac{M}{p_j} \right)^{-1} \bmod p_j.$$

The $b_j$'s enable an isomorphic mapping between an RNS N-tuple value representing a weighted number and the weighted number. However without loss of chaotic properties, the mapping need only be unique and isomorphic. As such, a weighted number x can map into a tuple y. The tuple y can map into a weighted number z. The weighted number x is not equal to z as long as all tuples map into unique values for z in a range from zero (0) to M−1. Thus for certain embodiments of the present invention, the $b_j$'s can be defined as $$b_j = \left(\frac{M}{p_j}\right)^{-1} \bmod p_j.$$

In other embodiments of the present invention, all $b_j$'s can be set equal to one or more non-zero values without loss of the chaotic properties.

As should be appreciated, the chaotic sequence output Y(nT) can be expressed in a binary number system representation. As such, the chaotic sequence output Y(nT) can be represented as a binary sequence. Each bit of the binary sequence has a zero (0) value or a one (1) value. The chaotic sequence output Y(nT) can have a maximum bit length (MBL) defined by a mathematical equation (8).

$$\text{MBL} = \text{Ceiling}[\text{Log } 2(M)] \quad (8)$$

where M is the product of the relatively prime numbers $p_0$, $p_1, \ldots, p_{N-1}$ selected as moduli $m_0, m_1, \ldots, m_{N-1}$. In this regard, it should be appreciated the M represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range M. The dynamic range requires a Ceiling[Log 2(M)] bit precision.

According to an embodiment of the invention, M equals three quadrillion five hundred sixty-three trillion seven hundred sixty-two billion one hundred ninety-one million fifty-nine thousand five hundred twenty-three (3,563,762,191,059,523). By substituting the value of M into equation (8), the bit length (BL) for a chaotic sequence output Y(nT) expressed in a binary system representation can be calculated as follows: BL=Ceiling[Log 2(3,563,762,191,059,523)]=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, chaotic sequence output Y(nT) can be a binary sequence representing a truncated portion of a value between zero (0) and M−1. In such a scenario, the chaotic sequence output Y can have a bit length less than Ceiling[Log 2(M)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (4) can be rewritten in a general iterative form: $f(x(nT)=Q(k)x^3((n-1)T)+R(k)x^2((n-1)T)+S(k)x((n-1)T)+C(k,L)$. For example, a fixed coefficient polynomial equation is selected as $f(x(n\cdot 1 \text{ ms}))=3x^3((n-1)\cdot 1 \text{ ms})+3x^2((n-1)\cdot 1 \text{ ms})+x((n-1)\cdot 1 \text{ ms})+8$ modulo 503. n is a variable having a value defined by an iteration being performed. x is a variable having a value allowable in a residue ring. In a first iteration, n equals one (1) and x is selected as two (2) which is allowable in a residue ring. By substituting the value of n and x into the stated polynomial equation f(x(nT)), a first solution having a value forty-six one (46) is obtained. In a second iteration, n is incremented by one and x equals the value of the first solution, i.e., forty-six (46) resulting in the solution 298, 410 mod 503 or one hundred thirty-one (131). In a third iteration, n is again incremented by one and x equals the value of the second solution.

Figure 8:
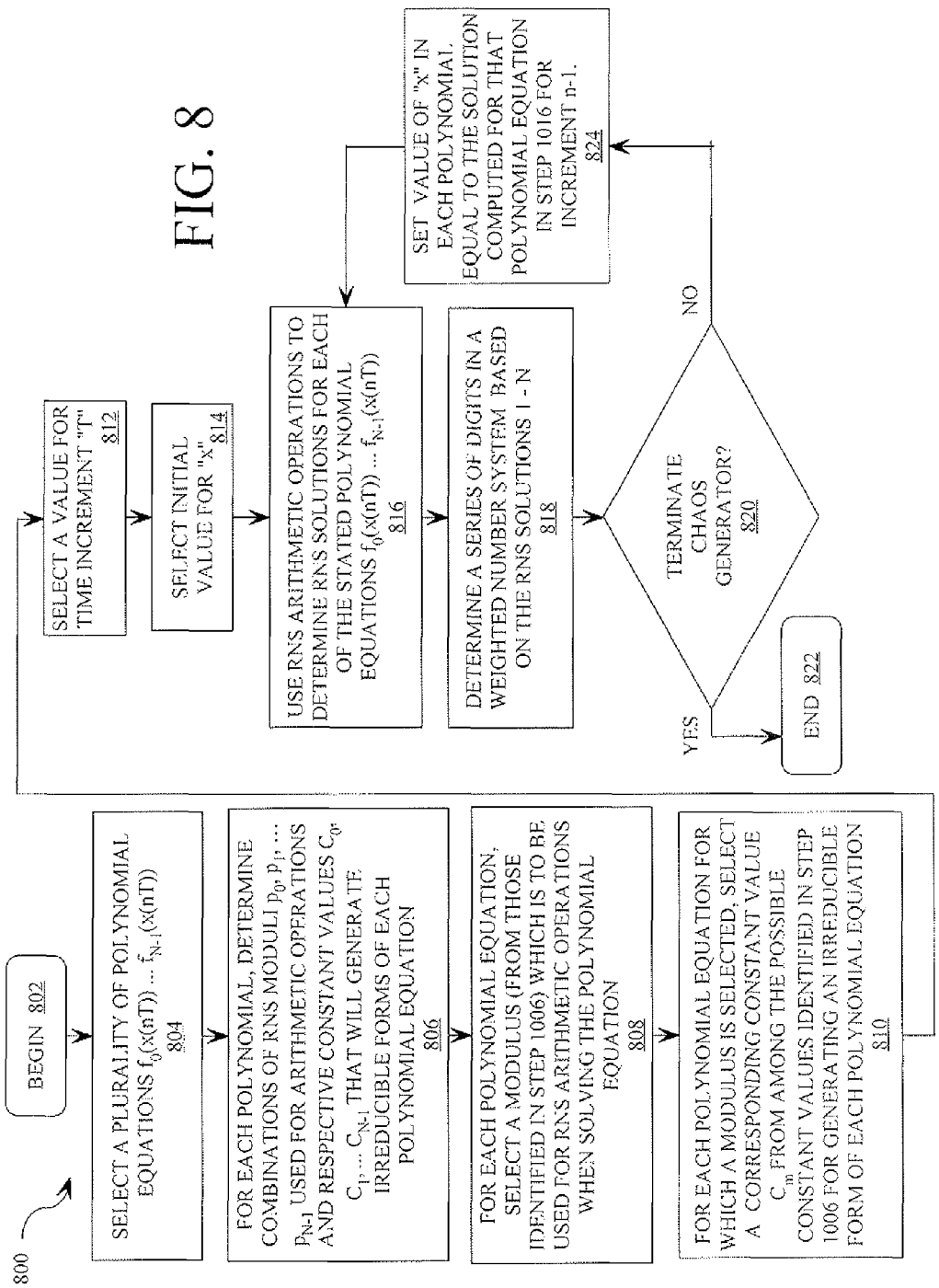
FIG. 8 is a flow diagram of a method for generating a chaotic sequence.

Referring now to FIG. 8, there is provided a flow diagram of a method 800 for generating a chaotic sequence that is useful for understanding the invention. As shown in FIG. 8, method 800 begins with step 802 and continues with step 804. In step 804, a plurality of polynomial equations $f_0(x(nT)), \ldots, f_{N-1}(x(nT))$ are selected. In this regard, it should be appreciated that the polynomial equations $f_0(x(nT)), \ldots, f_{N-1}(x(nT))$ can be selected as the same polynomial equation except for a different constant term or different polynomial equations. After step 804, step 806 is performed where a determination for each polynomial equation $f_0(x(nT)), \ldots, f_{N-1}(x(nT))$ is made as to which combinations of RNS moduli $m_0, m_1, \ldots, m_{N-1}$ used for arithmetic operations and respective constant values $C_0, C_1, \ldots, C_{N-1}$ generate irreducible forms of each polynomial equation $f_0(x(nT)), \ldots, f_{N-1}(x(nT))$. In step 808, a modulus is selected for each polynomial equation $f_0(x(nT)), \ldots, f_{N-1}(x(nT))$ that is to be used for RNS arithmetic operations when solving the polynomial equation $f_0(x(nT)), \ldots, f_{N-1}(x(nT))$. In this regard, it should be appreciated that the modulus is selected from the moduli identified in step 806. It should also be appreciated that a different modulus must be selected for each polynomial equation $f_0(x(nT)), \ldots, f_{N-1}(x(nT))$.

As shown in FIG. 8, the method 800 continues with a step 810. In step 810, a constant $C_m$ is selected for each polynomial equation $f_0(x(nT)), \ldots, f_{N-1}(x(nT))$ for which a modulus is selected. Each constant $C_m$ corresponds to the modulus selected for the respective polynomial equation $f_0(x(nT)), \ldots, f_{N-1}(x(nT))$. Each constant $C_m$ is selected from among the possible constant values identified in step 806 for generating an irreducible form of the respective polynomial equation $f_0(x(nT)), \ldots, f_{N-1}(x(nT))$.

After step 810, method 800 continues with step 812. In step 812, a value for time increment "T" is selected. Thereafter, step 814 is performed where an initial value for "x" is selected. In this regard, it should be appreciated that the initial value for "x" can be any value allowable in a residue ring. Subsequently, step 816 is performed where RNS arithmetic operations are used to iteratively determine RNS solutions for each of the stated polynomial equations $f_0(x(nT)), \ldots, f_{N-1}(x(nT))$. In step 818, a series of digits in a weighted number system are determined based in the RNS solutions. This step can involve performing a mixed radix arithmetic operation or a CRT arithmetic operation using the RNS solutions to obtain a chaotic sequence output.

After step 818, method 800 continues with a decision step 820. If a chaos generator is not terminated (820:NO), then step 824 is performed where a value of "x" in each polynomial equation $f_0(x(nT)), \ldots, f_{N-1}(x(nT))$ is set equal to the RNS solution computed for the respective polynomial equation $f_0(x(nT)), \ldots, f_{N-1}(x(nT))$ in step 816. Subsequently, method 800 returns to step 816. If the chaos generator is terminated (820:YES), then step 822 is performed where method 800 ends.

A person skilled in the art will appreciate that method 800 is one example of a method for generating a chaotic sequence. However, the invention is not limited in this regard and any other method for generating a chaotic sequence can be used without limitation.

Referring now to FIG. 9, there is illustrated one embodiment of chaos generator 2. Chaos generator 2 is comprised of hardware and/or software configured to generate a digital chaotic sequence. In this regard, it should be appreciated that chaos generator 2 is comprised of computing processors $902_0$-$902_{N-1}$. Chaos generator 2 is also comprised of a mapping processor 904. Each computing processor $902_0$-$902_{N-1}$ is coupled to mapping processor 904 by a respective data bus $906_0$-$906_{N-1}$. As such, each computing processor $902_0$-$902_{N-1}$ is configured to communicate data to mapping processor 904 via a respective data bus $906_0$-$906_{N-1}$. Mapping processor 904 can be coupled to an external device (not shown) via a data bus 908. In this regard, it should be appreciated that the external device (not shown) includes, but is not limited to, a communications device configured to combine or modify a signal in accordance with a chaotic sequence output.

Referring again to FIG. 9, computing processors $902_0$-$902_{N-1}$ are comprised of hardware and/or software configured to solve N polynomial equations $f_0(x(nT)), \ldots, f_{N-1}(x(nT))$ to obtain a plurality of solutions. The polynomial equations $f_0(x(nT)), \ldots, f_{N-1}(x(nT))$ can be irreducible polynomial equations having chaotic properties in Galois field arithmetic. Such irreducible polynomial equations include, but are not limited to, irreducible cubic polynomial equations and irreducible quadratic polynomial equations. The polynomial equations $f_0(x(nT)) \ldots f_{N-1}(x(nT))$ can also be identical exclusive of a constant value. The constant value can be selected so that a polynomial equation $f_0(x(nT)), \ldots, f_{N-1}(x(nT))$ is irreducible for a predefined modulus. The polynomial equations $f_0(x(nT)), \ldots, f_{N-1}(x(nT))$ can further be selected as a constant or varying function of time.

Each of the solutions can be expressed as a unique residue number system (RNS) N-tuple representation. In this regard, it should be appreciated that the computing processors $902_0$-$902_{N-1}$ employ modulo operations to calculate a respective solution for each polynomial equation $f_0(x(nT)), \ldots, f_{N-1}(x(nT))$ using modulo based arithmetic operations. Each of the computing processors $902_0$-$902_{N-1}$ are comprised of hardware and/or software configured to utilize a different relatively prime number $p_0, p_1, \ldots, p_{N-1}$ as a moduli $m_0, m_1, \ldots, m_{N-1}$ for modulo based arithmetic operations. The computing processors $902_0$-$902_{N-1}$ are also comprised of hardware and/or software configured to utilize modulus $m_0, m_1, \ldots, m_{N-1}$ selected for each polynomial equation $f_0(x(nT)), \ldots, f_{N-1}(x(nT))$ so that each polynomial equation $f_0(x(nT)), \ldots, f_{N-1}(x(nT))$ is irreducible. The computing processors $902_0$-$902_{N-1}$ are further comprised of hardware and/or software configured to utilize moduli $m_0, m_1, \ldots, m_{N-1}$ selected for each polynomial equation $f_0(x(nT)), \ldots, f_{N-1}(x(nT))$ so that solutions iteratively computed via a feedback mechanism $910_0$-$910_{N-1}$ are chaotic. In this regard, it should be appreciated that the feedback mechanisms $910_0$-$910_{N-1}$ are provided so that the solutions for each polynomial equation $f_0(x(nT)), \ldots, f_{N-1}(x(nT))$ can be iteratively computed. Accordingly, the feedback mechanisms $910_0$-$910_{N-1}$ are comprised of hardware and/or software configured to selectively define a variable "x" of a polynomial equation as a solution computed in a previous iteration.

Referring again to FIG. 9, computing processors $902_0$-$902_{N-1}$ are further comprised of hardware and/or software configured to express each of the RNS residue values in a binary number system representation. In this regard, the computing processors $902_0$-$902_{N-1}$ can employ an RNS-to-binary conversion method. Such methods are generally known to persons skilled in the art and therefore will not be described in great detail herein. However, it should be appreciated that any such method can be used without limitation. It should also be appreciated that the residue values expressed in binary number system representations are hereinafter referred to as moduli solutions Nos. 1 through N comprising the elements of an RNS N-tuple.

According to an embodiment of the invention, computing processors $902_0$-$902_{N-1}$ are further comprised of memory based tables (not shown) containing pre-computed residue values in a binary number system representation. The address space of each memory table is at least from zero (0) to $m_m-1$ for all m, $m_0$ through $m_{N-1}$. On each iteration, the table address is used to initiate the sequence. Still, the invention is not limited in this regard.

Referring again to FIG. 9, mapping processor 904 is comprised of hardware and/or software configured to map the moduli (RNS N-tuple) solutions Nos. 1 through N to a weighted number system representation. The result is a series of digits in the weighted number system based on the moduli solutions Nos. 1 through N. For example, the mapping processor 904 can be comprised of hardware and/or software configured to determine the series of digits in the weighted number system based on the RNS residue values using a Chinese Remainder Theorem process. In this regard, it will be appreciated by those skilled in the art that the mapping processor 904 is comprised of hardware and/or software configured to identify a number in the weighted number system that is defined by the moduli solutions Nos. 1 through N.

According to an aspect of the invention, the mapping processor 904 can be comprised of hardware and/or software configured to identify a truncated portion of a number in the weighted number system that is defined by the moduli solutions Nos. 1 through N. For example, the mapping processor 904 can also be comprised of hardware and/or software configured to select the truncated portion to include any serially arranged set of digits of the number in the weighted number system. Further, the mapping processor 904 can include hardware and/or software configured to select the truncated portion to be exclusive of a most significant digit when all possible weighted numbers represented by P bits are not mapped, i.e., when $M-1<2^P$. P is a fewest number of bits required to achieve a binary representation of the weighted numbers. Still, the invention is not limited in this regard.

Referring again to FIG. 9, mapping processor 904 is comprised of hardware and/or software configured to express a chaotic sequence in a binary number system representation. In this regard, it should be appreciated that the mapping processor 904 can employ a weighted-to-binary conversion method. Such methods are generally known to persons skilled in the art and therefore will not be described in great detail herein. However, it should be appreciated that any such method can be used without limitation.

A person skilled in the art will appreciate that chaos generator 2 is one architecture of a chaos generator. However, the invention is not limited in this regard and any other chaos generator architecture can be used without limitation.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for receiving an RF spread spectrum signal, having a duration of sampling intervals selectively varied in accordance with a first pseudo-random sequence to introduce a known dither in said RF spread spectrum signal, comprising:
 converting said RF spread spectrum signal to a received analog IF spread spectrum signal;
 using a second pseudo-random sequence to remove said known dither in said received analog IF spread spectrum signal to generate a uniform received sampled analog IF spread spectrum signal having a uniform sampling interval; and
 converting said received analog IF spread spectrum signal to a received digital IF spread spectrum signal.

2. The method according to claim 1, wherein said second pseudo-random sequence is a chaotic sequence.

3. The method according to claim 1, further comprising using a de-spreading code to de-spread said RF spread spectrum signal.

4. The method according to claim 3, wherein said de-spreading code is a chaotic sequence.

* * * * *